United States Patent
Agiwal et al.

(10) Patent No.: US 11,792,890 B2
(45) Date of Patent: Oct. 17, 2023

(54) METHOD AND APPARATUS FOR INITIATING RADIO RESOURCE CONTROL (RRC) CONNECTION FOR VEHICLE-TO-EVERYTHING (V2X) COMMUNICATION

(71) Applicant: Samsung Electronics Co., Ltd., Suwon-si (KR)

(72) Inventors: Anil Agiwal, Suwon-si (KR); Hyunjeong Kang, Suwon-si (KR); Hyunseok Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/556,038

(22) Filed: Dec. 20, 2021

(65) Prior Publication Data

US 2022/0117038 A1 Apr. 14, 2022

Related U.S. Application Data

(63) Continuation of application No. 16/831,275, filed on Mar. 26, 2020, now Pat. No. 11,206,712.

(Continued)

(51) Int. Cl.
*H04W 88/06* (2009.01)
*H04W 4/44* (2018.01)
(Continued)

(52) U.S. Cl.
CPC ............. *H04W 88/06* (2013.01); *H04W 4/44* (2018.02); *H04W 76/14* (2018.02); *H04W 76/27* (2018.02); *H04W 92/18* (2013.01)

(58) Field of Classification Search
CPC ....... H04W 88/06; H04W 88/04; H04W 4/44; H04W 4/40; H04W 76/14; H04W 76/27;
(Continued)

(56) References Cited

U.S. PATENT DOCUMENTS

| 10,383,023 B1 | 8/2019 | Hahn |
| 10,531,485 B2 | 1/2020 | Agiwal et al. |

(Continued)

FOREIGN PATENT DOCUMENTS

| IN | 1128/KOL/2014 A | 11/2015 |
| WO | 2019/036578 A1 | 2/2019 |

OTHER PUBLICATIONS

Catt; New Triggers for Uu RRC Connection Establishment/Resume; 3GPP TSG-RAN WG2 Meeting #105; R2-1900161; Feb. 25-Mar. 1, 2019; Athens, Greece.

(Continued)

*Primary Examiner* — Farid Seyedvosoghi
(74) *Attorney, Agent, or Firm* — Jefferson IP Law, LLP

(57) ABSTRACT

A communication method and system for converging a 5$^{th}$ generation (5G) communication system for supporting higher data rates beyond a 4$^{th}$ generation (4G) system with (Continued)

a technology for Internet of things (IoT) are provided. The communication method and system include intelligent services based on the 5G communication technology and the IoT-related technology, such as smart home, smart building, smart city, smart car, connected car, health care, digital education, smart retail, security and safety services. A method of a user equipment (UE) for performing a vehicle-to-everything (V2X) sidelink communication is provided.

20 Claims, 28 Drawing Sheets

Related U.S. Application Data

(60) Provisional application No. 62/825,366, filed on Mar. 28, 2019, provisional application No. 62/824,637, filed on Mar. 27, 2019, provisional application No. 62/823,752, filed on Mar. 26, 2019.

(51) Int. Cl.
 *H04W 92/18* (2009.01)
 *H04W 76/14* (2018.01)
 *H04W 76/27* (2018.01)

(58) Field of Classification Search
 CPC ... H04W 92/18; H04W 84/047; H04W 72/02; H04W 72/0453; H04W 72/53
 See application file for complete search history.

(56) References Cited

U.S. PATENT DOCUMENTS

2016/0295624 A1  10/2016 Novlan et al.
2019/0222979 A1   7/2019 Hahn et al.
2021/0274452 A1*  9/2021 Khoryaev .......... H04W 72/569

OTHER PUBLICATIONS

Huawei et al.; Mobility enhancements for mode-1 and mode-2; 3GPP TSG-RAN WG2 Meeting 105; R2-1902045; Feb. 25-Mar. 1, 2019; Athens, Greece.
LG Electronics Inc.; NR Sidelink design based on LTE Sidelink; 3GPP TSG-RAN WG2 #103bis; R2-1815441; Oct. 8-12, 2018; Chengdu, China.
European Search Report dated Mar. 10, 2022; European Appln. No. 20778498.4-1231 / 3928591 PCT/KR2020004150.
3GPP; TSG RAN; NR; Study on Vehicle-to-Everything (Release 16), 3GPP TR 38.885 V2.0.0,Mar. 12, 2019 section 6.2.1.1.
Huawei, 'Principles for resource pool assignment', R3-190625, 3GPP TSG-RAN3 Meeting #103, Athens, Greece, Feb. 15, 2019, section 2.1.
Ericsson, 'Resource coordination for cross-RAT V2X sidelink communication', R3-190822, 3GPP TSG-RAN3 Meeting #10, Athens, Greece, Feb. 16, 2019, sections 1-2; and figures 1-2.
NTT Docomo, Inc., 'Uu-based sidelink resource allocation/configuration for NR V2X', R1-1900966, 3GPP TSG RAN WG1 Meeting #AH1901, Taipei, Jan. 11, 2019, sections 2-3.
International Search Report dated Jul. 2, 2002, issued in International Application No. PCT/KR2020/004150.
Indian Office Action dated Feb. 1, 2023, issued in Indian Application No. 202137041853.

* cited by examiner

METHOD AND APPARATUS FOR INITIATING RADIO RESOURCE CONTROL (RRC) CONNECTION FOR VEHICLE-TO-EVERYTHING (V2X) COMMUNICATION

CROSS-REFERENCE TO RELATED APPLICATION(S)

This application is a continuation application of prior application Ser. No. 16/831,275, filed on Mar. 26, 2020, which has issued as U.S. Pat. No. 11,206,712 on Dec. 21, 2021, which is based on and claimed priority under 35 U.S.C. § 119 (e) of a U.S. Provisional application Ser. No. 62/823,752, filed on Mar. 26, 2019, in the U.S. Patent and Trademark Office, of a U.S. Provisional application Ser. No. 62/824,637, filed on Mar. 27, 2019, in the U.S. Patent and Trademark Office, and of a U.S. Provisional application Ser. No. 62/825,366, filed on Mar. 28, 2019, in the U.S. Patent and Trademark Office, of the disclosure of each of which is incorporated by reference herein in its entirety.

BACKGROUND

1. Field

The disclosure relates to a method for initiating radio resource control (RRC) connection for vehicle-to-everything (V2X) communication and a method for handling resources for hybrid automatic repeat request (HARQ) retransmission in V2X sidelink communication.

2. Description of Related Art

To meet the demand for wireless data traffic having increased since deployment of 4th generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) System.' The 5G wireless communication system is considered to be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large-scale antenna techniques are being considered in the design of the 5G wireless communication system. In addition, in 5G communication systems, development for system network improvement is under-way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving to the internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In recent years, several broadband wireless technologies have been developed to meet the growing number of broadband subscribers and to provide more and better applications and services such as these. The second generation (2G) wireless communication system has been developed to provide voice services while ensuring the mobility of users. Third generation (3G) wireless communication system supports the voice service and data service. The 4G wireless communication system has been developed to provide high-speed data service. However, the 4G wireless communication system currently suffers from lack of resources to meet the growing demand for high speed data services. Therefore, the 5G wireless communication system is being developed to meet the growing demand of various services with diverse requirements, e.g., high-speed data services, support ultra-reliability and low-latency applications.

In addition, the 5G wireless communication system is expected to address different use cases having quite different requirements in terms of data rate, latency, reliability, mobility etc. However, it is expected that the design of the air-interface of the 5G wireless communication system will be flexible enough to serve user equipments (UEs) having quite different capabilities depending on the use case and market segment in which the UE caters service to the end customer. Example use cases the 5G wireless communication system is expected to address includes enhanced mobile broadband (eMBB), massive machine type communication (m-MTC), ultra-reliable low-latency communication (URLL), etc. The eMBB requirements (e.g. tens of Gbps data rate, low-latency, high-mobility, and so on) address the market segment representing the wireless broadband subscribers needing internet connectivity everywhere, all the time and on the go. The m-MTC requirements (e.g., very high connection density, infrequent data transmission, very long battery life, low mobility address and so on) address the market segment representing the IoT/IoE envisioning connectivity of billions of devices. The URLL requirements (e.g., very low latency, very high reliability variable mobility, and so forth) address the market segment representing the Industrial automation application and vehicle-to-vehicle/vehicle-to-infrastructure communication that is foreseen as one of the enablers for autonomous cars.

Vehicular communication services, represented by vehicle-to-everything (V2X) services, can include vehicle-to-vehicle (V2V), vehicle-to-infrastructure (V2I), vehicle-to-network (V2N) and vehicle-to-pedestrian (V2P) types. V2X services can be provided by PC5 interface and/or Uu interface. Support of V2X services via PC5 interface is provided by V2X sidelink communication, which is a mode of communication whereby UEs can communicate with each other directly over the PC5 interface, and is supported when the UE is served by next generation radio access network (NG-RAN) and when the UE is outside of NG-RAN coverage. Only the UEs authorized to be used for V2X services can perform V2X sidelink communication.

The UE supporting V2X sidelink communication can operate in two modes for resource allocation:

(1) Scheduled resource allocation (also referred as mode 1), in which:

The UE needs to be radio resource control connected (RRC_CONNECTED) in order to transmit data, and The UE requests transmission resources from the next generation node B (gNB), which schedules transmission resources for transmission of sidelink control information and data.

(2) UE autonomous resource selection (also referred as mode 2), in which:

The UE unilaterally selects resources from resource pools and performs transport format selection to transmit sidelink control information and data, and The UE performs sensing for (re)selection of sidelink resources.

Based on sensing results, the UE (re)selects some specific sidelink resources and reserves multiple sidelink resources.

A UE is considered in-coverage on the carrier used for V2X sidelink communication whenever it detects a cell on that carrier. If the UE that is authorized for V2X sidelink communication is in-coverage on the frequency used for V2X sidelink communication or if the gNB provides V2X sidelink configuration for that frequency (including when the UE is out of coverage on that frequency), the UE uses the scheduled resource allocation or UE autonomous resource selection as a per gNB configuration. When the UE is out of coverage on the frequency used for V2X sidelink communication and if the gNB does not provide V2X sidelink configuration for that frequency, the UE may use a set of transmission and reception resource pools pre-configured in the UE. V2X sidelink communication resources are not shared with other non-V2X data transmitted over the sidelink.

An RRC_CONNECTED UE may send a sidelink UE information message to the serving cell if it is interested in V2X sidelink communication transmission in order to request sidelink resources. If the UE is configured by upper layers to receive V2X sidelink communication and V2X sidelink reception resource pools are provided, the UE receives communication on those provided resources.

For V2X sidelink communication, sidelink transmission and/or reception resources including an exceptional pool for different frequencies for scheduled resource allocation and UE autonomous resource selection may be provided. The sidelink resources for different frequencies can be provided via dedicated signaling, system information block 21 (SIB21) and/or pre-configuration. The serving cell may indicate to the UE only the frequency on which the UE may acquire the resource configuration for V2X sidelink communication. If multiple frequencies and associated resource information are provided, it is up to UE implementation to select the frequency among the provided frequencies. The UE shall not use preconfigured transmission resource if the UE detects a cell providing resource configuration or inter-carrier resource configuration for V2X sidelink communication. Frequencies which may provide V2X sidelink communication resource configuration or cross-carrier configuration can be signaled in the SIB21 or pre-configured in the UE. The radio resource control idle (RRC_IDLE) UE may prioritize the frequency that provides cross-carrier resource configuration for V2X sidelink communication during cell reselection.

If the UE supports multiple transmission chains, it may simultaneously transmit on multiple carriers via PC5. When multiple frequencies for V2X are supported, a mapping between V2X service types and V2X frequencies is configured by upper layers. The UE should ensure a V2X service to be transmitted on the corresponding frequency. For scheduled resource allocation, the gNB can schedule a V2X transmission on a frequency based on the sidelink buffer status report (BSR), in which the UE includes the destination index uniquely associated with a frequency reported by the UE to the gNB in a sidelink UE information message.

V2X sidelink communication technology was defined and is referred as LTE V2X sidelink communication in the 4G system. V2X sidelink communication is being enhanced to support enhanced V2X use cases in the 5G system, which are broadly arranged into four use case groups:

1) Vehicles platooning enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.

2) Extended sensors enable the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced driving enables semi-automated or full-automated driving. Each vehicle and/or road side unit (RSU) shares its own perception data obtained from its local sensors with vehicles in proximity and that allows vehicles to synchronize and coordinate their trajectories or maneuvers. Each vehicle shares its driving intention with vehicles in proximity too.

4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Issue 1: According to current sidelink design, if mode 2 or common transmission (TX) resource pool(s) are configured in system information (e.g. V2X SIB) and UE is in RRC_IDLE or radio resource control inactive (RRC_INACTIVE) state, it has to use mode 2 or common TX resources. Mode 1 (i.e. dedicated resources) are beneficial for latency sensitive advanced V2X use cases. In order to enable RRC_IDLE/INACTIVE UEs to obtain mode 1 (i.e. dedicated resources), network may not configure mode or common TX resource pool(s) in system information. However, this is not an efficient approach as this will trigger all V2X UEs in RRC_IDLE or RRC_INACTIVE state and interested in V2X sidelink communication to initiate RRC connection. So, an efficient method of initiating connection is needed.

Issue 2: There are two radio access technologies (RATs) for V2X sidelink communication. LTE V2X sidelink communication supports broadcast communication and caters limited V2X use cases. New radio (NR) V2X sidelink communication supports unicast/broadcast/groupcast communication for advanced V2X uses cases.

In NR system, following configurations are supported.

gNB (or NR Cell) can configure V2X sidelink communication configuration for NR Sidelink gNB (or NR Cell) can configure V2X sidelink communication configuration for LTE Sidelink gNB (or NR Cell) can configure V2X sidelink communication configuration for LTE Sidelink and NR sidelink Scenario 1: UE is camped on an NR Cell. It broadcasts transmission resource pool(s) for V2X sidelink communication. The RAT corresponding to these resources is NR sidelink. V2X service which initiated sidelink communication needs to use LTE sidelink. However, as per current condition, UE cannot initiate RRC connection as system information broadcasts transmission resource pool(s) for V2X sidelink communication.

Scenario 2: UE is camped on an NR Cell. It broadcasts transmission resource pool(s) for V2X sidelink communication. The RAT corresponding to these resources is LTE sidelink. V2X service which initiated sidelink communication needs to use NR sidelink. However, as per current condition, UE cannot initiate RRC connection as system information broadcasts transmission resource pool(s) for V2X sidelink communication.

Scenario 3: UE is camped on an NR Cell. It broadcasts transmission resource pool(s) for V2X sidelink communication. The RAT corresponding to these resources is LTE sidelink or NR sidelink. V2X service which initiated sidelink communication needs to use NR sidelink as well as LTE sidelink. However, as per current condition, UE cannot initiate RRC connection.

To overcome the above issues, a trigger to initiate RRC connection needs to be enhanced.

In addition, in NR V2X sidelink communication, HARQ feedback is supported for unicast and groupcast communication.

Scenario 4: Transmitter, i.e. TX UE is in coverage and gNB configures mode 1 resource for transmission.

Basic Operation: UE transmits sidelink (SL) BSR to gNB. TX UE receives physical downlink control channel (PDCCH) addressed to SL V2X radio network temporary identifier (SL-V-RNTI) from gNB wherein downlink control information (DCI) indicates resource for SL transmission. UE generates the MAC protocol data unit (PDU). UE transmits physical SL control channel (PSCCH). UE transmits SL transport block (TB) (incl. MAC PDU) on physical SL shared channel (PSSCH). Reception (RX) UE sends SL HARQ feedback (HARQ-acknowledge (ACK) or HARQ-negative ACK (NACK)) on physical SL feedback channel (PSFCH).

Issue 3: In case TX UE receives sidelink HARQ-NACK from RX UE, the issue is how to perform HARQ retransmission, e.g. how the TX UE obtains resource for HARQ retransmission.

Issue 4: In LTE, V2X communication source layer-2 identifier (ID) is always included in SL shared channel (SCH) MAC header of MAC PDU. NR V2X sidelink communication supports unicast/groupcast/broadcast communication. NR V2X supports HARQ feedback for unicast/groupcast. HARQ feedback can be enabled/disabled. Considering the above characteristics of NR V2X communication, it is not efficient to always include source layer-2 ID in SL SCH MAC header. A method to determine whether to include source layer-2 ID in SL SCH MAC header or not is needed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a 5th generation (5G) communication system for supporting higher data rates beyond a 4th generation (4G) system.

Additional aspects will be set forth in part in the description which follows and, in part, will be apparent from the description, or may be learned by practice of the presented embodiment.

In accordance with an aspect of the disclosure, a method of a user equipment (UE) for performing a vehicle-to-everything (V2X) sidelink communication is provided. The method includes determining to transmit a first radio access technology (RAT) V2X sidelink communication on a first frequency, receiving, from a base station associated with a second RAT on a second frequency, system information on the first RAT V2X sidelink communication, in case that the first frequency corresponds to the second frequency, identifying whether the system information includes transmission resources for the first RAT V2X sidelink communication on the first frequency, in case that the system information does not include the transmission resources for the first RAT V2X sidelink communication on the first frequency, initiating a radio resource control (RRC) connection for the first RAT V2X sidelink communication, transmitting, to the base station, a sidelink UE information message for the first RAT V2X sidelink communication upon establishing the RRC connection, and receiving, from the base station, an RRC reconfiguration message including the transmission resources for the first RAT V2X sidelink communication on the first frequency.

In accordance with another aspect of the disclosure, a user equipment (UE) for performing a V2X sidelink communication is provided. The UE includes a transceiver and at least one processor operatively coupled with the transceiver and configured to determine to transmit a first RAT V2X sidelink communication on a first frequency, control the transceiver to receive, from a base station associated with a second RAT on a second frequency, system information on the first RAT V2X sidelink communication, in case that the first frequency corresponds to the second frequency, identify whether the system information includes transmission resources for the first RAT V2X sidelink communication on the first frequency, in case that the system information does not include the transmission resources for the first RAT V2X sidelink communication on the first frequency, control the transceiver to initiate an RRC connection for the first RAT V2X sidelink communication, control the transceiver to transmit, to the base station, a sidelink UE information message for the first RAT V2X sidelink communication upon establishing the RRC connection, and control the transceiver to receive, from the base station, an RRC reconfiguration message including the transmission resources for the first RAT V2X sidelink communication on the first frequency.

In accordance with another aspect of the disclosure, a method of a base station for performing a V2X sidelink communication is provided. The method includes transmitting, to a UE, system information on a first RAT V2X sidelink communication based on a second RAT on a first frequency, wherein the UE is configured to transmit the first RAT V2X sidelink communication on a second frequency, in case that the second frequency corresponds to the first frequency and the system information does not include transmission resources for the first RAT V2X sidelink communication on the second frequency, initiating an RRC connection for the first RAT V2X sidelink communication, receiving, from the UE, a sidelink UE information message for the first RAT V2X sidelink communication upon establishing the RRC connection, and transmitting, to the UE, an RRC reconfiguration message including the transmission resources for the first RAT V2X sidelink communication on the second frequency.

In accordance with another aspect of the disclosure, a method of a base station for performing a V2X sidelink communication is provided. The base station includes a transceiver and at least one processor operatively coupled with the transceiver. The at least one processor is configured to control the transceiver to transmit, to a user equipment (UE), system information on a first radio access technology (RAT) V2X sidelink communication based on a second RAT on a first frequency, wherein the UE is configured to transmit the first RAT V2X sidelink communication on a second frequency, in case that the second frequency corresponds to the first frequency and the system information does not include transmission resources for the first RAT V2X sidelink communication on the second frequency, initiate a radio resource control (RRC) connection for the first RAT V2X sidelink communication, control the transceiver to receive, from the UE, a sidelink UE information message for the first RAT V2X sidelink communication upon establishing the RRC connection, and control the transceiver to transmit, to the UE, an RRC reconfiguration message including the transmission resources for the first RAT V2X sidelink communication on the second frequency.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
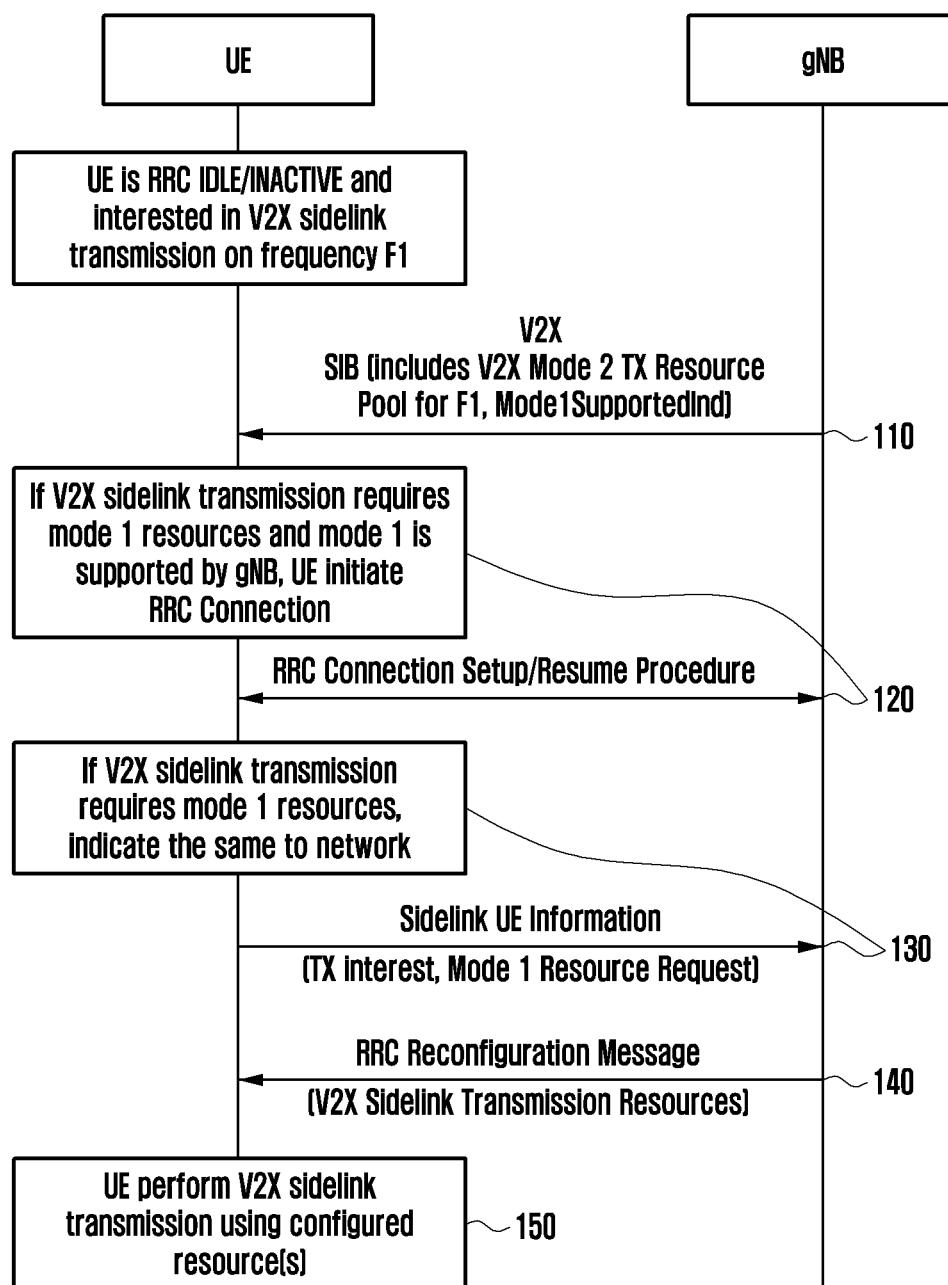
FIG. 1 is an example illustration of a method according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special-purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

Connection Initiation Triggers for Mode 1 Resource Allocation

According to current sidelink design, if one or more common transmission (TX) resource pool(s) are configured in system information (e.g. vehicle-to-everything (V2X) system information block (SIB)) and UE is in radio resource control idle (RRC_IDLE) or radio resource control inactive (RRC_INACTIVE) state, it has to use mode 2 (also referred as common TX resources) transmission resources for V2X sidelink transmission. Mode 1 (also referred as dedicated resources) transmission resources are beneficial for latency sensitive advanced V2X use cases. In order to enable RRC_IDLE/INACTIVE UEs to obtain dedicated transmission resources, network may not configure common TX resource pool(s) in system information. However, this is not an efficient approach as this will trigger all V2X UEs in RRC_IDLE or RRC_INACTIVE state and interested in V2X sidelink transmission to initiate RRC connection.

In the RRC_IDLE and RRC_INACTIVE, UE has access to only mode 2 (i.e. common) transmission resource pool(s) configured via system information. So in order to enable UE to request and get configured with mode 1 transmission resources, it is proposed that UE interested in V2X sidelink transmission can initiate RRC connection even if mode 2 transmission resources are broadcasted by the camped cell for the frequency (serving or non-serving) on which the UE is configured to transmit new radio (NR) V2X sidelink communication.

In one method of this disclosure, it is proposed that:
UE camped on a cell in RRC_IDLE/INACTIVE state and interested in mode 1 transmission resources, initiates an RRC connection, if the frequency on which the UE is configured to transmit V2X sidelink communication concerns the camped frequency and if the system information (i.e. V2X SIB) received/acquired from the camped cell includes V2X sidelink configuration for the camped frequency.
UE camped on cell in RRC_IDLE/INACTIVE state and interested in mode 1 transmission resources, initiates an RRC connection, if the frequency on which the UE is configured to transmit V2X sidelink communication is included in V2X inter-frequency information list in system information (i.e. V2X SIB) received/acquired from the camped cell.
UE camped on an NR cell in RRC_IDLE/INACTIVE state and interested in mode 1 transmission resources for NR V2X sidelink communication, initiates an RRC connection on the NR cell, if the frequency on which the UE is configured to transmit NR V2X sidelink communication concerns the camped frequency and if the system information (i.e. V2X SIB) received/acquired from the camped cell includes NR V2X sidelink configuration for the camped frequency.
UE camped on an NR cell in RRC_IDLE/INACTIVE state and interested in mode 1 transmission resources for NR V2X sidelink communication, initiates an RRC connection on the NR cell, if the frequency on which the UE is configured to transmit NR V2X sidelink communication is included in V2X inter-frequency information list in system information (i.e. V2X SIB) received/acquired from the camped cell (i.e. NR cell).

UE camped on an long term evolution (LTE) cell in RRC_IDLE/INACTIVE state and interested in mode 1 transmission resources for NR V2X sidelink communication, initiates an RRC connection on the LTE cell, if the frequency on which the UE is configured to transmit NR V2X sidelink communication concerns the camped frequency and if the system information (i.e. V2X SIB) received/acquired from the camped cell (i.e. LTE cell) includes NR V2X sidelink configuration for the camped frequency.

UE camped on an LTE cell in RRC_IDLE/INACTIVE state and interested in mode 1 transmission resources for NR V2X sidelink communication, initiates an RRC connection on the LTE cell, if the frequency on which the UE is configured to transmit NR V2X sidelink communication is included in V2X inter-frequency information list in system information (i.e. V2X SIB) received/acquired from the camped cell (i.e. LTE cell).

It is possible that camped cell may only support mode 2 transmission resource configuration for camped frequency as well as for other frequencies. To avoid unnecessary connection initiation for mode 1 transmission resources, it is also proposed that cell can indicate (common for all frequencies or individually for each frequency) whether mode 1 is supported or not in system information. In another method of this disclosure, it is proposed that:

UE camped on a cell in RRC_IDLE/INACTIVE state and interested in mode 1 transmission resources, initiates an RRC connection, if the frequency on which the UE is configured to transmit V2X sidelink communication concerns the camped frequency and if the system information (i.e. V2X SIB) received/acquired from the camped cell includes V2X sidelink configuration for the camped frequency and indicates that mode 1 transmission resources are supported by the camped cell on the camped frequency.

UE camped on cell in RRC_IDLE/INACTIVE state and interested in mode 1 transmission resources, initiates an RRC connection, if the frequency on which the UE is configured to transmit V2X sidelink communication is included in V2X inter-frequency information list in system information (i.e. V2X SIB) received/acquired from the camped cell and mode 1 transmission resources for V2X sidelink communication are supported by the camped cell on concerned frequency.

UE camped on an NR cell in RRC_IDLE/INACTIVE state and interested in mode 1 transmission resources for NR V2X sidelink communication, initiates an RRC connection on the NR cell, if the frequency on which the UE is configured to transmit NR V2X sidelink communication concerns the camped frequency and if the system information (i.e. V2X SIB) received/acquired from the camped cell (i.e. NR cell) includes NR V2X sidelink configuration for the camped frequency and mode 1 transmission resources for NR V2X sidelink communication are supported by the camped cell on the camped frequency.

UE camped on an NR cell in RRC_IDLE/INACTIVE state and interested in mode 1 transmission resources for NR V2X sidelink communication, initiates an RRC connection on the NR cell, if the frequency on which the UE is configured to transmit NR V2X sidelink communication is included in V2X inter-frequency information list in system information (i.e. V2X SIB) received/acquired from the camped cell (i.e. NR cell) and mode 1 transmission resources for NR V2X sidelink communication are supported by the camped cell on concerned frequency.

UE camped on an LTE cell in RRC_IDLE/INACTIVE state and interested in mode 1 transmission resources for NR V2X sidelink communication, initiates an RRC connection on the LTE cell, if the frequency on which the UE is configured to transmit NR V2X sidelink communication concerns the camped frequency (i.e. frequency of the camped LTE cell) and if the system information (i.e. V2X SIB) received/acquired from the camped cell includes NR V2X sidelink configuration for the camped frequency and mode 1 transmission resources for NR V2X sidelink communication are supported by the camped cell on the camped frequency.

UE camped on an LTE cell in RRC_IDLE/INACTIVE state and interested in mode 1 transmission resources for NR V2X sidelink communication, initiates an RRC connection on the LTE cell, if the frequency on which the UE is configured to transmit NR V2X sidelink communication is included in V2X inter-frequency information list in system information (i.e. V2X SIB) received/acquired from the camped cell (i.e. LTE cell) and mode 1 transmission resources for NR V2X sidelink communication are supported by the camped cell on concerned frequency.

FIG. 1 is an example illustration of a method according to an embodiment of the disclosure.

Referring to FIG. 1, UE is in RRC_IDLE/INACTIVE state and interested in V2X sidelink transmission on frequency F1. UE acquires the V2X SIB(s) transmitted by the camped cell at operation 110. The acquired V2X SIB includes mode 2 transmission resource pool(s) for frequency F1. The V2X SIB also includes information indicating that the mode 1 transmission resources are supported for frequency F1 (the indication Mode1 SupportedInd can be common for all V2X frequencies or individually for each frequency). In an embodiment, Mode1 SupportedInd indication can be ConnectionAllowedInd or ConnectionAllowedforMode 1. Even though the mode 2 transmission resource pool(s) for frequency F1 are included in V2X SIB, if the V2X sidelink transmission requires mode 1 transmission resources and mode 1 transmission resources are supported on frequency F1, UE initiates an RRC connection setup/resume procedure at operation 120. In order to determine whether mode 1 transmission resources are required for V2X sidelink transmission or not, mapping between V2X services and mode1/mode 2 transmission resources can be (pre-)configured. After the RRC connection is setup at operation 120, UE transmits sidelink UE information message to gNB/BS to indicate that it is interested in V2X sidelink transmission on frequency F1 and it needs mode 1 transmission resources at operation 130. UE may include at least one of a list of destinations of communication, or QoS flow identifiers (IDs)/quality of service (QoS) profile IDs in sidelink UE information message. The destination list can be separate for each type (broadcast/unicast/groupcast). Alternately UE may include communication type associated with each destination instead of separate list for each communication type. gNB/BS configures V2X sidelink transmission resources (mode 1, additionally mode 2 can also be configured) and transmits information on the V2X sidelink transmission resources in an RRC reconfiguration message to the UE at operation 140. UE performs V2X sidelink transmission using the configured resources at operation 150.

In an embodiment, Mode1 SupportedInd may not be included in V2X SIB if mode 2 transmission resource pool(s) are not included in V2X SIB.

In an embodiment, Mode1SupportedInd may not be included in V2X SIB. If the V2X sidelink transmission requires mode 1 transmission resources, UE in RRC_IDLE/INACTIVE state initiates RRC connection.

Figure 2:
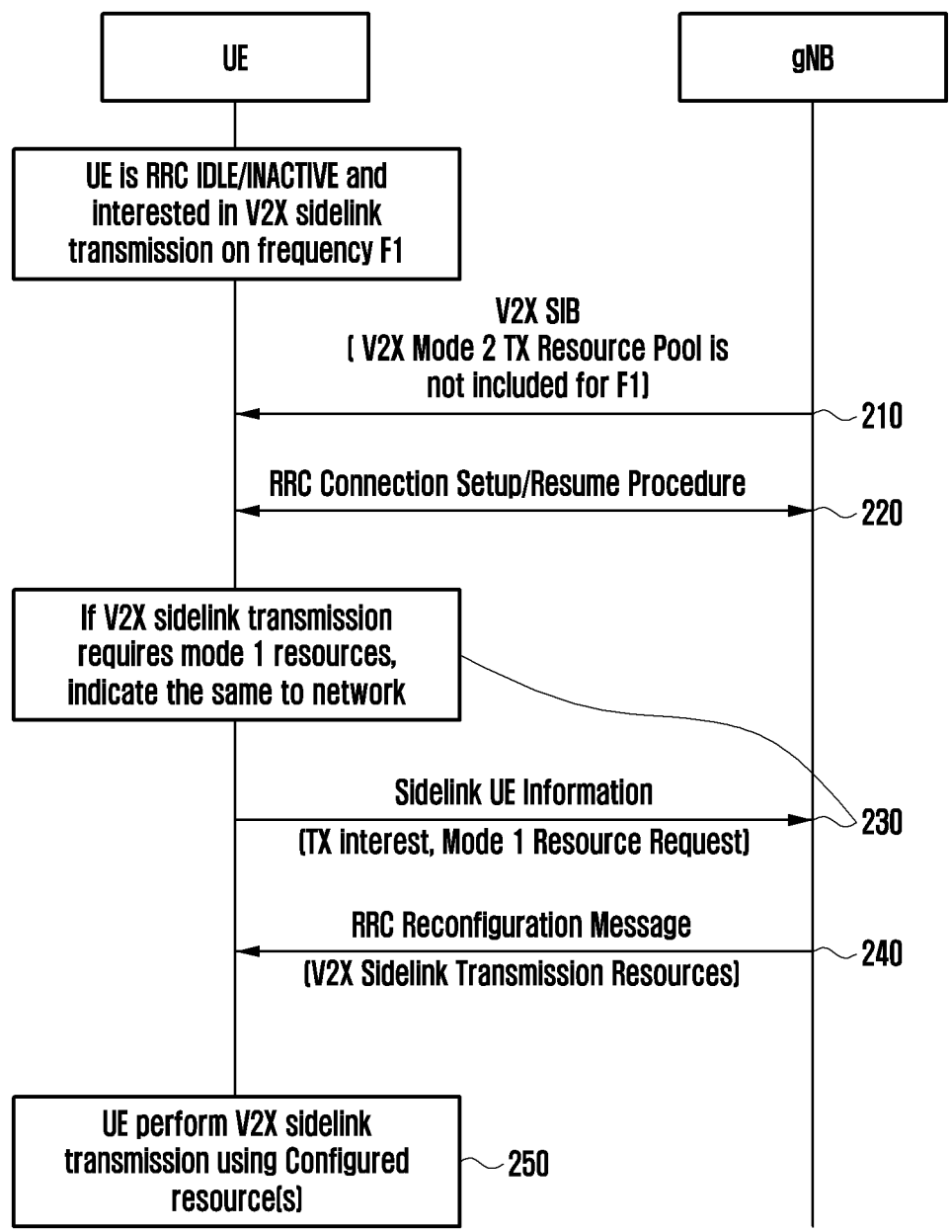
FIG. 2 is another example illustration of a method according to an embodiment of the disclosure.

FIG. 2 is another example illustration of a method according to an embodiment of the disclosure.

Referring to FIG. 2, UE is in RRC_IDLE/INACTIVE state and interested in V2X sidelink transmission on frequency F1. UE acquires the V2X SIB(s) transmitted by the camped cell at operation 210. In this example, the acquired V2X SIB does not include mode 2 transmission resource pool(s) for frequency F1. Since the mode 2 transmission resource pool(s) for frequency F1 are not included in V2X SIB, UE initiates an RRC connection setup/resume procedure at operation 220. After the RRC connection is setup at operation 220, UE transmits sidelink UE information message to gNB/BS to indicate that it is interested in V2X sidelink transmission on frequency F1 at operation 230. If the V2X sidelink transmission requires mode 1 transmission resources, UE also indicates that it needs mode 1 transmission resources at operation 230. UE may include at least one of a list of destinations of communication, or QoS flow IDs/QoS profile IDs in sidelink UE information message. The destination list can be separate for each type (broadcast/unicast/groupcast). Alternately UE may include communication type associated with each destination instead of separate list for each communication type. In order to determine whether mode 1 transmission resources are required for V2X sidelink transmission or not, mapping between V2X services and mode1/mode 2 transmission resources can be (pre-)configured. gNB/BS configures V2X sidelink transmission resources (mode 1, additionally mode 2 can also be configured) and transmits information on the V2X sidelink transmission resources in an RRC reconfiguration message to the UE at operation 240. UE performs V2X sidelink transmission using the configured resources at operation 250.

Figure 3:
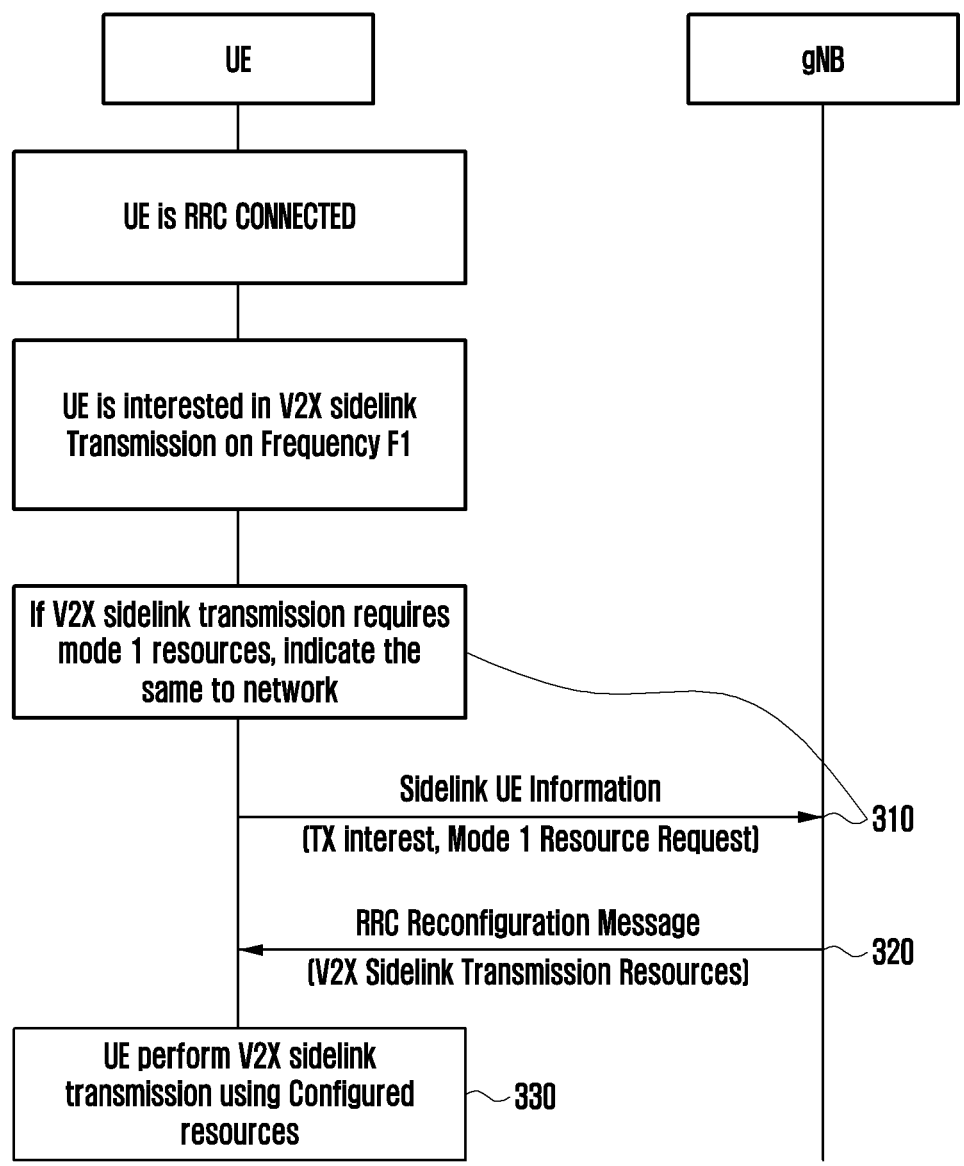
FIG. 3 is another example illustration of a method according to an embodiment of the disclosure.

FIG. 3 is another example illustration of a method according to an embodiment of the disclosure.

Referring to FIG. 3, UE is in RRC_CONNECTED state and interested in V2X sidelink transmission on frequency F1. UE acquires the V2X SIB(s) transmitted by the camped cell. UE transmits sidelink UE information message to gNB/BS to indicate that it is interested in V2X sidelink transmission on frequency F1 at operation 310. If the V2X sidelink transmission requires mode 1 transmission resources, UE also indicates that it needs mode 1 transmission resources at operation 310. UE may include at least one of a list of destinations of communication, or QoS flow IDs/QoS profile IDs in sidelink UE information message. The destination list can be separate for each type (broadcast/unicast/groupcast). Alternately UE may include communication type associated with each destination instead of separate list for each communication type. In order to determine whether mode 1 transmission resources are required for V2X sidelink transmission or not, mapping between V2X services and mode1/mode 2 transmission resources can be (pre-)configured. gNB/BS configures V2X sidelink transmission resources (mode 1, additionally mode 2 can also be configured) and transmits information on the V2X sidelink transmission resources in an RRC reconfiguration message at operation 320. UE performs V2X sidelink transmission using the configured resources at operation 330.

Connection Initiation Triggers for Congestion Control

In the RRC_IDLE/INACTIVE state, UE performs autonomous resource selection. eNB provides TX resource pool(s). UE autonomously selects the resource(s) from the TX resource pool based on sensing. UE in RRC_IDLE/INACTIVE state may fail to obtain the resource in case of congestion or if channel busy ratio (CBR) is very high resulting in transmission failure. CBR is the portion of sub-channels whose S—RSSI exceed a (pre-)configured threshold.

Figure 4:
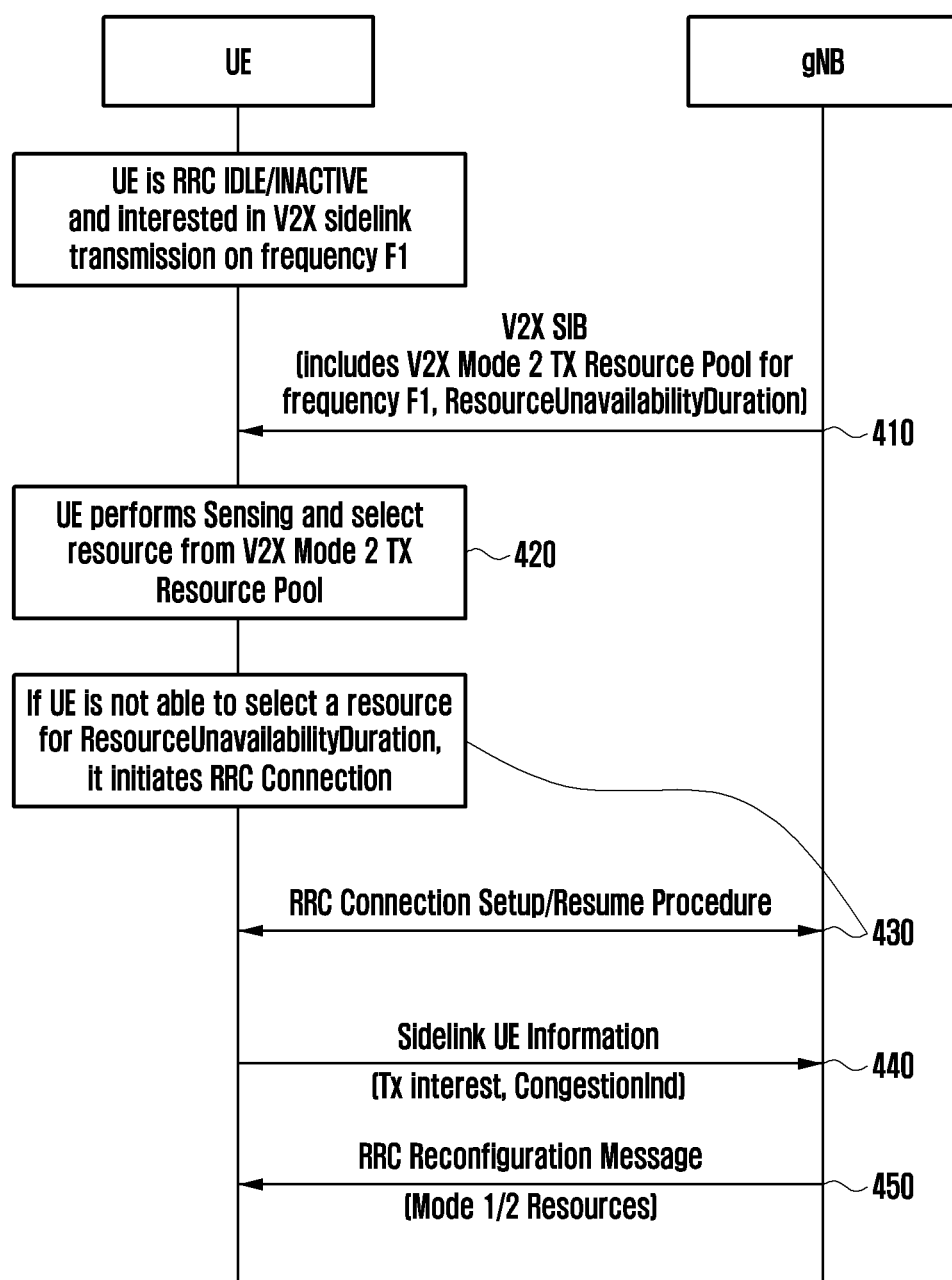
FIG. 4 is an example illustration of a method according to an embodiment of the disclosure.

FIG. 4 is an example illustration of a method according to an embodiment of the disclosure.

Referring to FIG. 4, UE is in RRC_IDLE/INACTIVE state and interested in V2X sidelink transmission on frequency F1. UE acquires the V2X SIB(s) transmitted by the camped cell at operation 410. The acquired V2X SIB includes mode 2 TX resource pool(s) for frequency F1. The V2X SIB also includes information on duration for which the UE cannot select resource, i.e. ResourceUnavailabilityDuration. The UE obtains the TX resource pool for V2X sidelink transmission from the V2X SIB. UE performs sensing on V2X mode 2 TX resource pool to select the resource at operation 420. UE shall initiate an RRC connection setup/resume procedure at operation 430, if it is not able to select resource (based on sensing) for a (pre-)configured duration (ResourceUnavailabilityDuration). After the RRC connection is setup at operation 430, UE transmits sidelink UE information message to gNB/BS to indicate that it is interested in V2X sidelink transmission on frequency F1 at operation 440. UE can also include congestion indication in the sidelink UE information message, so that network can accordingly configure mode 1 resources or mode 2 resource pool(s) and transmit information on mode 1 or 2 resources in an RRC reconfiguration message to UE at operation 450.

Figure 5:
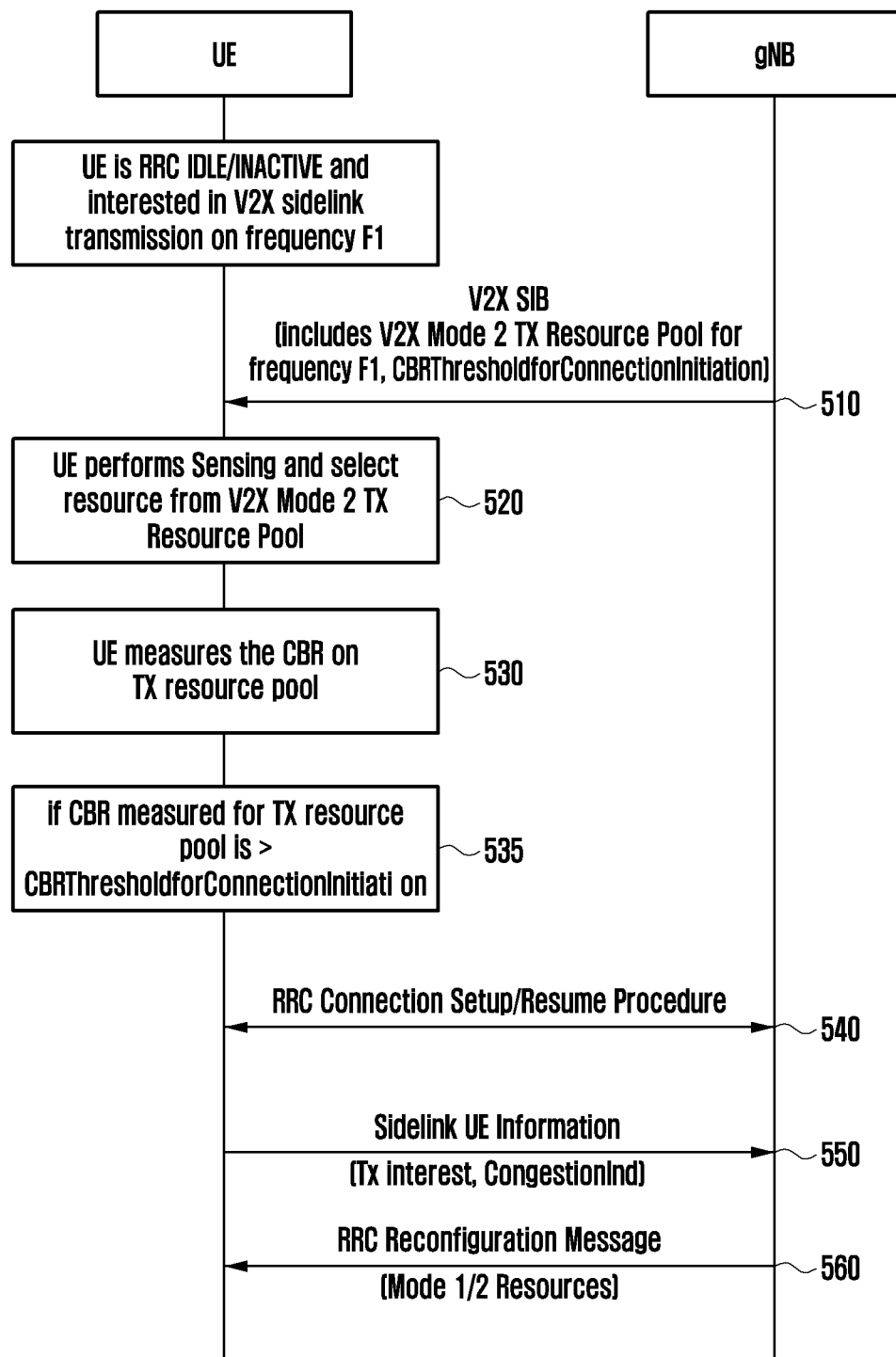
FIG. 5 is another example illustration of a method according to an embodiment of the disclosure.

FIG. 5 is an example illustration of a method according to an embodiment of the disclosure.

Referring to FIG. 5, UE is in RRC_IDLE/INACTIVE state and interested in V2X sidelink transmission on frequency F1. UE acquires the V2X SIB(s) transmitted by the camped cell at operation 510. The acquired V2X SIB includes mode 2 TX resource pool(s) for frequency F1. The V2X SIB also includes information on CBR threshold for connection initiation, i.e. CBRThresholdforConnectionInitiation. The UE obtains the TX resource pool for V2X sidelink transmission from the V2X SIB. UE performs sensing on TX resource pool to select the resource at operation 520. UE also measures CBR on the TX resource pool at operation 530. The UE determines whether CBR measured for TX resource pool is greater than (pre-)configured threshold, i.e. CBRThresholdforConnectionInitiation at operation 535. UE shall initiate an RRC connection setup/resume procedure, if CBR measured for TX resource pool is greater than (pre-)configured threshold. In case there are multiple TX resource pool(s), UE shall initiate an RRC connection setup/resume procedure, if CBR measured for all TX resource pools is greater than (pre-)configured threshold. After the RRC connection is setup at operation 540, UE transmits sidelink UE information message to gNB/BS to indicate that it is interested in V2X sidelink transmission on frequency F1 at operation 550. UE can also include congestion indication in the sidelink UE information message, so that network can accordingly configure mode 1 resources or mode 2 resource pool(s) to UE and transmit information on mode 1 or 2 resources in an RRC reconfiguration message to the UE at operation 560.

NR Connection Initiation Triggers for V2X Sidelink Communication

There are two radio access technologies (RATs) for V2X sidelink communication. LTE V2X sidelink communication supports broadcast communication and caters limited V2X use cases. NR V2X sidelink communication supports unicast/broadcast/groupcast communication for advanced V2X uses cases. V2X services are mapped to NR and/or LTE sidelink. GNB (or NR cell) can configure V2X sidelink communication configuration for NR sidelink, or gNB (or NR cell) can configure V2X sidelink communication configuration for LTE sidelink, or gNB (or NR cell) can configure V2X sidelink communication configuration for LTE sidelink and NR sidelink. NR V2X SI includes the following to support the above configurations:
1. NR V2X sidelink (SL) inter carrier frequency list
    TX resource pool(s) for listed frequency is optionally included
2. LTE V2X SL inter carrier frequency list
    TX resource pool(s) for listed frequency is optionally included
3. NR V2X SL configuration for serving frequency
    TX resource pool(s) is optionally included
4. LTE V2X SL configuration for serving frequency
    TX resource pool(s) is optionally included Scenario 1: UE is camped on cell of first RAT (i.e. NR) but interested in V2X sidelink communication based on second RAT (i.e. LTE) on the camped frequency.

Figure 6:
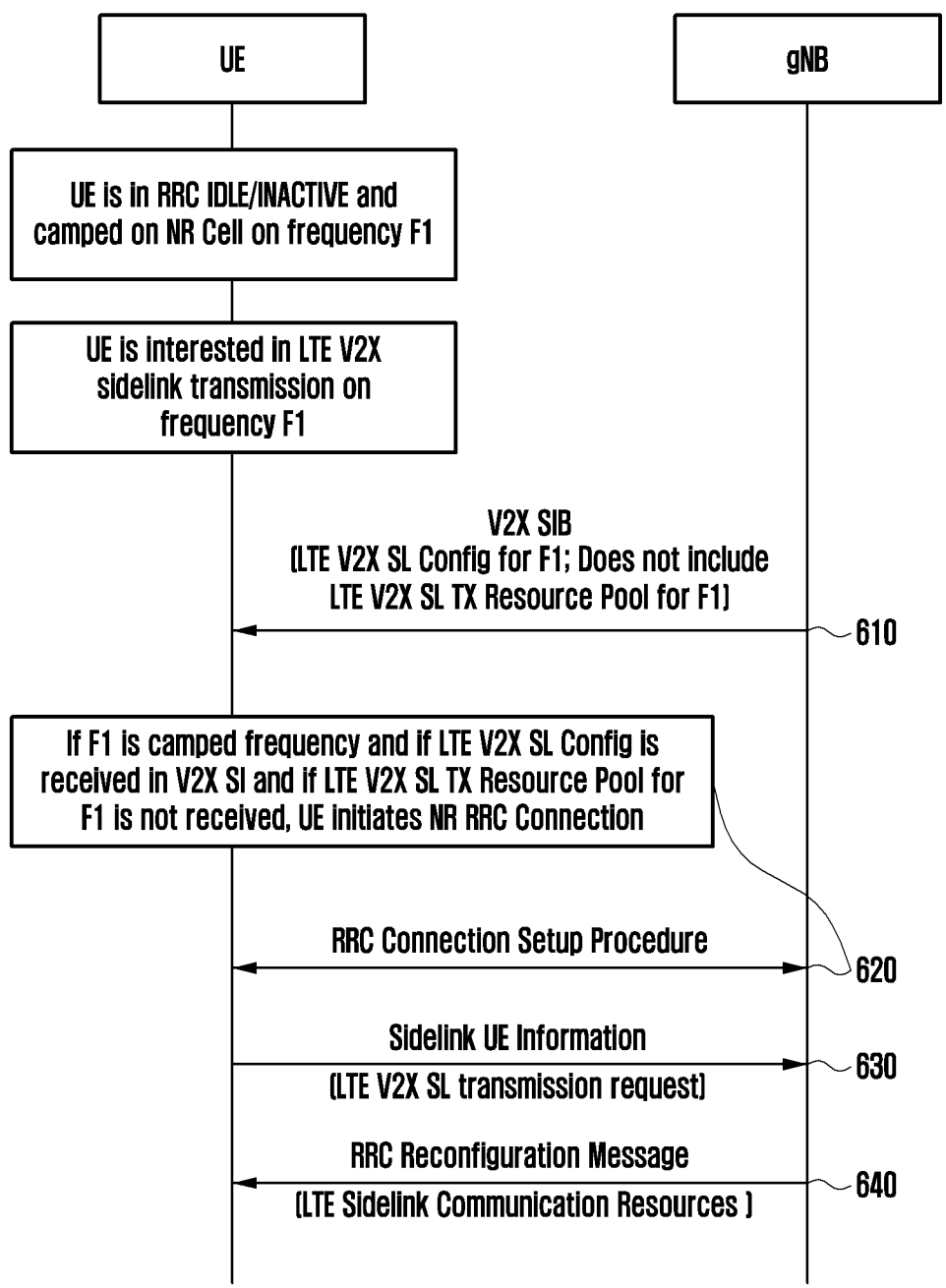
FIG. 6 illustrates a method for new radio (NR) connection initiation triggers for vehicle-to-everything (V2X) sidelink communication according to an embodiment of the disclosure.

FIG. 6 illustrates a method for NR connection initiation triggers for V2X sidelink communication according to an embodiment of the disclosure.

In one method of this disclosure as illustrated in FIG. 6, it is proposed that UE camped on an NR cell, initiates an RRC connection on the NR cell, if the frequency on which the UE is configured to transmit LTE V2X sidelink communication concerns the camped frequency (i.e. frequency of NR cell); and if the system information (i.e. V2X SIB) received/acquired from the camped cell (i.e. NR cell) includes LTE V2X sidelink communication configuration/parameters for the camped frequency but does not include transmission resource pool for LTE V2X sidelink communication on the camped frequency. In an embodiment, NR cell may transmit LTE V2X sidelink communication configuration/parameters and NR V2X sidelink communication configuration/parameters in different V2X SIBs.

Referring to FIG. 6, UE camped on an NR cell on frequency F1 is in RRC_IDLE/INACTIVE state and interested in LTE V2X sidelink transmission on frequency F1. The UE receives V2X SIB(s) from the NR cell on frequency F1 at operation 610. The V2X SIB(s) may include at least one of NR V2X SL inter carrier frequency list, LTE V2X SL inter carrier frequency list, NR V2X SL configuration for serving frequency, or LTE V2X SL configuration for serving frequency. In addition, the V2X SIB(s) may optionally include NR and/or LTE TX resource pool(s) for the listed frequency or the serving frequency. The UE determines, if F1 is the camped frequency, and if LTE V2X SL configuration is received in V2X SI, and if LTE V2X SL TX resource pool for F1 is received based on the received V2X SIB. It is assumed that in this case of FIG. 6, the V2X SIB includes LTE V2X SL configuration for F1 but does not include LTE V2X SL TX resource pool for F1. In the case of FIG. 6 that F1 is the camped frequency, and LTE V2X SL configuration is received in V2X SI, and LTE V2X SL TX resource pool for F1 is not received, the UE initiates an NR RRC connection setup/resume procedure at operation 620. After the RRC connection is setup at operation 620, the UE transmits a sidelink UE information message to the NR cell (i.e. gNB) on frequency F1 to indicate that UE is interested in LTE V2X sidelink communication transmission or to request resources for LTE V2X SL communication transmission at operation 630. In an embodiment, different sidelink UE information messages (e.g. LTE sidelink UE information message and NR sidelink UE information message) can be used for LTE V2X SL communication and NR V2X SL communication. Based on the received message (LTE sidelink UE information message and NR sidelink UE information message) gNB can identify whether UE is interested in LTE V2X sidelink communication transmission or NR V2X sidelink communication transmission and accordingly provide LTE V2X sidelink communication transmission or NR V2X sidelink communication transmission resources. Alternately, same sidelink UE information message can be used for the LTE V2X SL communication and the NR V2X SL communication wherein message includes separate fields/information elements (IEs) for LTE V2X SL communication and NR V2X SL communication and UE includes them accordingly.

The gNB configures LTE sidelink communication resources, and transmits an RRC reconfiguration including information on the LTE sidelink communication transmission resources to the UE at operation 640.

Scenario 2: UE is camped on cell of first RAT (i.e. NR) but interested in sidelink communication based on second RAT (i.e. LTE) on frequency other than the camped frequency.

Figure 7:
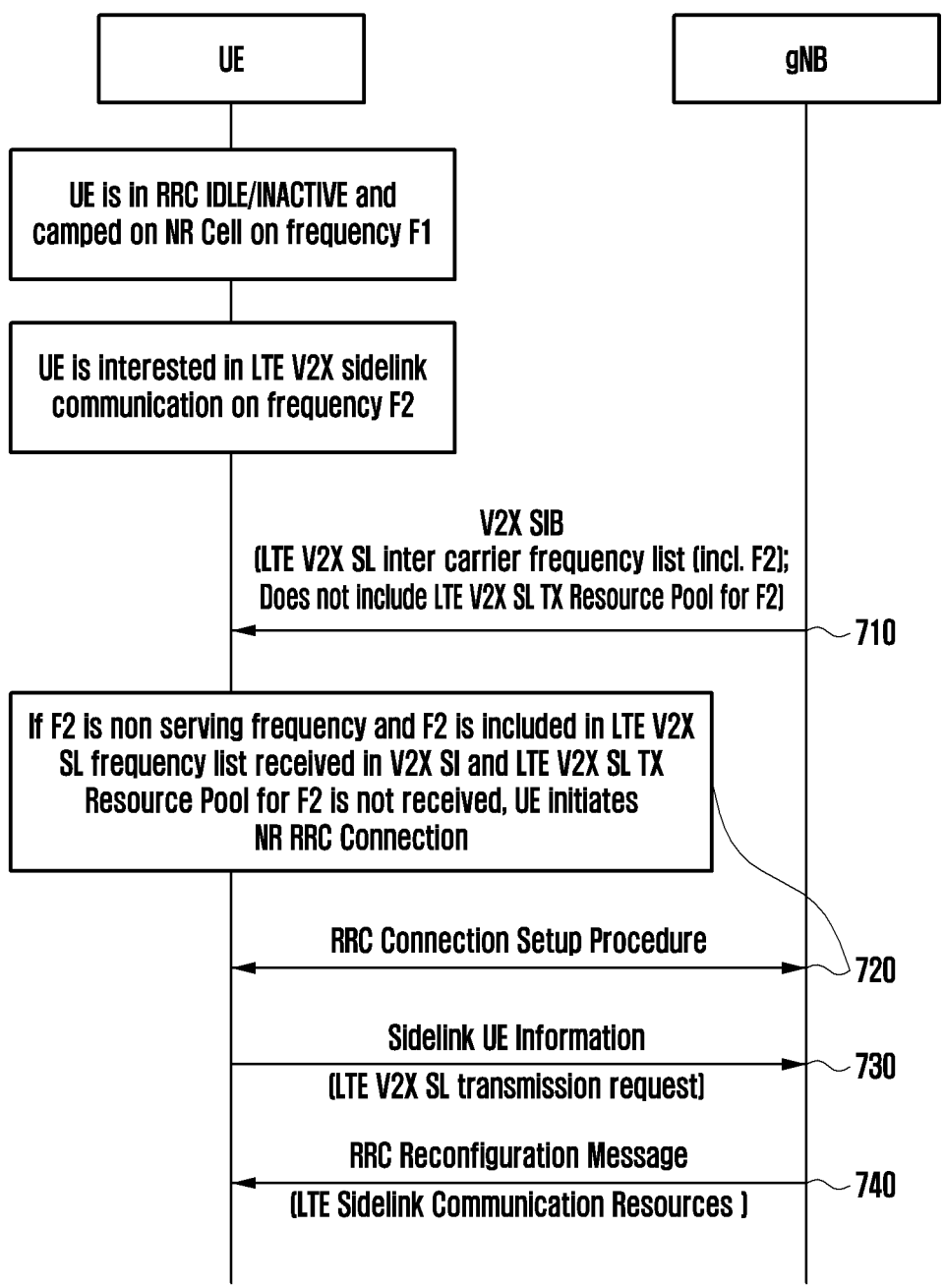
FIG. 7 illustrates another method for NR connection initiation triggers for V2X sidelink communication according to an embodiment of the disclosure.

FIG. 7 illustrates another method for NR connection initiation triggers for V2X sidelink communication according to an embodiment of the disclosure.

In one method of this disclosure as illustrated in FIG. 7, it is proposed that UE camped on an NR cell, initiates an RRC connection on NR cell, if the frequency on which the UE is configured to transmit LTE V2X sidelink communication is included in V2X inter frequency information list for LTE V2X sidelink communication broadcasted in system information (i.e. V2X SIB) transmitted by NR cell; and if the system information (i.e. V2X SIB) broadcasted by the camped cell does not include transmission resource pool for LTE V2X sidelink communication on the concerned frequency. In an embodiment, NR cell may transmit LTE V2X sidelink communication configuration/parameters and NR V2X sidelink communication configuration/parameters in different V2X SIBs.

Referring to FIG. 7, UE camped on an NR cell on frequency F1 is in RRC_IDLE/INACTIVE state and interested in LTE V2X sidelink transmission on frequency F2. The UE receives V2X SIB(s) from the NR cell on frequency F1 at operation 710. The V2X SIB(s) may include at least one of NR V2X SL inter carrier frequency list, LTE V2X SL inter carrier frequency list, NR V2X SL configuration for serving frequency, or LTE V2X SL configuration for serving frequency. In addition, the V2X SIB(s) may optionally include NR and/or LTE TX resource pool(s) for the listed frequency or the serving frequency. The UE determines, if F2 is serving frequency, and if F2 is included in LTE V2X SL frequency list, and if LTE V2X SL TX resource pool for F2 is received based on the received V2X SIB. It is assumed that in this case of FIG. 7, the V2X SIB includes LTE V2X SL inter carrier frequency list, and the LTE V2X SL inter carrier frequency list includes F2, but does not include LTE V2X SL TX resource pool for F2. In the case of FIG. 7 that F2 is not serving frequency, and F2 is included in LTE V2X SL frequency list received in V2X SIB, and LTE V2X SL TX resource pool for F2 is not received, the UE initiates an NR RRC connection setup/resume procedure at operation 720. After the RRC connection is setup at operation 720, the UE transmits a sidelink UE information message to the NR cell (i.e. gNB) on frequency F1 to indicate that UE is interested in LTE V2X sidelink communication transmission or to request resources for LTE V2X SL communication transmission at operation 730. The gNB configures LTE sidelink communication transmission resources, and transmits an RRC reconfiguration including information on the LTE sidelink communication transmission resources to the UE at operation 740. In an embodiment, different sidelink UE information messages (e.g. LTE sidelink UE information message and NR sidelink UE information message) can be used for LTE V2X SL communication and NR V2X SL communication. Based on the received message (LTE sidelink UE information message and NR sidelink UE information message) gNB can identify whether UE is interested in LTE V2X sidelink communication transmission or NR V2X sidelink communication transmission and accordingly provide LTE V2X sidelink communication transmission or NR V2X sidelink communication transmission resources. Alternately, same sidelink UE information message can be used for the LTE V2X SL communication and the NR V2X SL communication wherein message includes separate fields/IEs for LTE V2X SL communication and NR V2X SL communication and UE includes them accordingly.

Scenario 3: UE is camped on cell of first RAT (i.e. NR) and interested in sidelink communication based on first RAT (i.e. NR) on the camped frequency.

Figure 8:
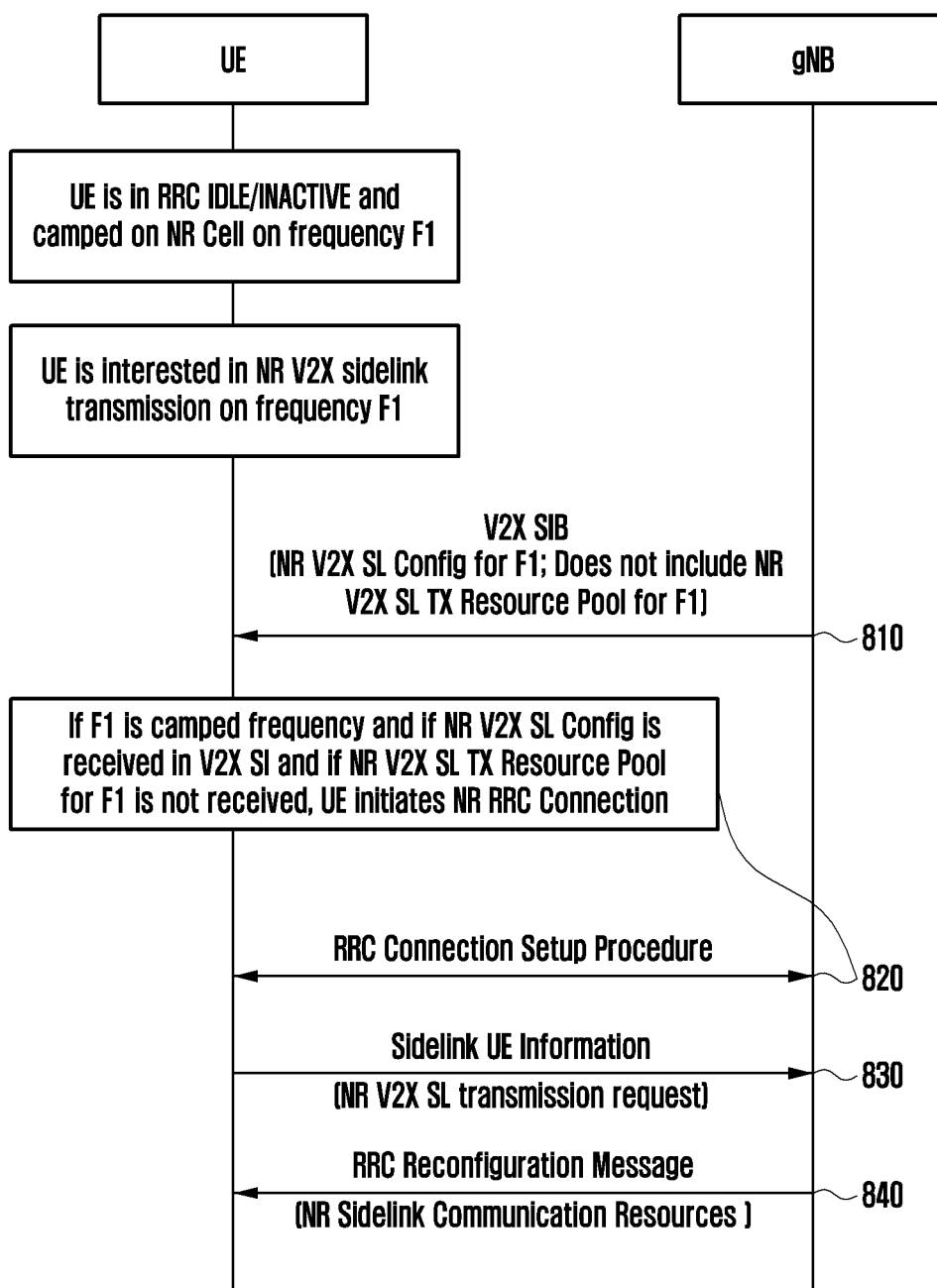
FIG. 8 illustrates another method for NR connection initiation triggers for V2X sidelink communication according to an embodiment of the disclosure.

FIG. 8 illustrates another method for NR connection initiation triggers for V2X sidelink communication according to an embodiment of the disclosure.

In one method of this disclosure as illustrated in FIG. 8, it is proposed that UE camped on an NR cell, initiates an RRC connection on the NR cell, if the frequency on which the UE is configured to transmit NR V2X sidelink communication concerns the camped frequency; and if the system information (i.e. V2X SIB) broadcasted by the camped cell includes NR V2X sidelink communication configuration/parameters for the camped frequency but does not include transmission resource pool for NR V2X sidelink communication on the camped frequency. In an embodiment, NR cell may transmit LTE V2X sidelink communication configuration/parameters and NR V2X sidelink communication configuration/parameters in different V2X SIBs.

Referring to FIG. 8, UE camped on an NR cell on frequency F1 is in RRC_IDLE/INACTIVE state and interested in NR V2X sidelink transmission on frequency F1. The UE receives V2X SIB(s) from the NR cell on frequency F1 at operation 810. The V2X SIB may include at least one of NR V2X SL inter carrier frequency list, LTE V2X SL inter carrier frequency list, NR V2X SL configuration for serving frequency, or LTE V2X SL configuration for serving frequency. In addition, the V2X SIB may optionally include NR and/or LTE TX resource pool(s) for the listed frequency or the serving frequency. The UE determines, if F1 is the camped frequency, and if NR V2X SL configuration is received in V2X SI, and if NR V2X SL TX resource pool for F1 is received based on the received V2X SIB. It is assumed that in this case of FIG. 8, the V2X SIB includes NR V2X SL configuration for F1 but does not include NR V2X SL TX resource pool for F1. In the case of FIG. 8 that F1 is the camped frequency, and NR V2X SL configuration is received in V2X SI, and NR V2X SL TX resource pool for F1 is not received, the UE initiates an NR RRC connection setup/resume procedure at operation 820. After the RRC connection is setup at operation 820, the UE transmits a sidelink UE information message to the NR cell (i.e. gNB) on frequency F1 to indicate that UE is interested in NR V2X sidelink communication transmission or to request NR V2X SL communication transmission resources at operation 830. The gNB configures NR sidelink communication transmission resources, and transmits an RRC reconfiguration including information on the NR sidelink communication resources to the UE at operation 840. In an embodiment, different sidelink UE information messages (e.g. LTE sidelink UE information message and NR sidelink UE information message) can be used for LTE V2X SL communication and NR V2X SL communication. Based on the received message (LTE sidelink UE information message and NR sidelink UE information message) gNB can identify whether UE is interested in LTE V2X sidelink communication transmission or NR V2X sidelink communication transmission and accordingly provide LTE V2X sidelink communication transmission or NR V2X sidelink communication transmission resources. Alternately, same sidelink UE information message can be used for the LTE V2X SL communication and the NR V2X SL communication wherein message includes separate fields/IEs for LTE V2X SL communication and NR V2X SL communication and UE includes them accordingly.

Scenario 4: UE is camped on cell of first RAT (i.e. NR) and interested in sidelink communication based on first RAT (i.e. NR) on frequency other than the camped frequency.

Figure 9:
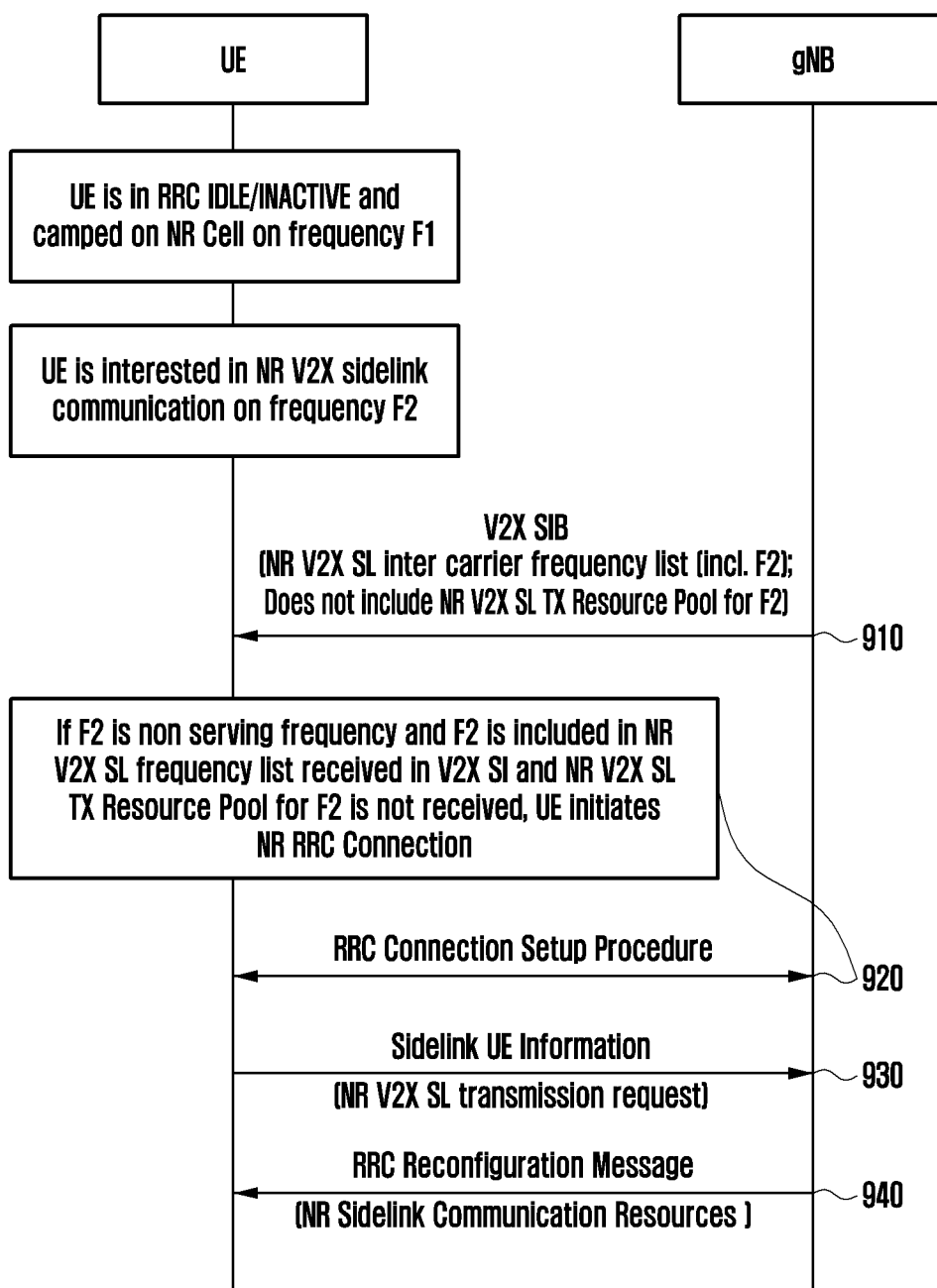
FIG. 9 illustrates another method for NR connection initiation triggers for V2X sidelink communication according to an embodiment of the disclosure.

FIG. 9 illustrates another method for NR connection initiation triggers for V2X sidelink communication according to an embodiment of the disclosure.

In one method of this disclosure as illustrated in FIG. 9, it is proposed that UE camped on an NR cell, initiates an RRC connection on NR cell, if the frequency on which the UE is configured to transmit NR V2X sidelink communication is included in V2X inter frequency information list for NR sidelink communication broadcasted in system information (i.e. V2X SIB) transmitted by NR cell; and if the system information (i.e. V2X SIB) broadcasted by the camped cell does not include transmission resource pool for NR V2X sidelink communication on the concerned frequency. In an embodiment, NR cell may transmit LTE V2X sidelink communication configuration/parameters and NR V2X sidelink communication configuration/parameters in different V2X SIBs.

Referring to FIG. 9, UE camped on an NR cell on frequency F1 is in RRC_IDLE/INACTIVE state and interested in NR V2X sidelink transmission on frequency F2. The UE receives V2X SIB(s) from the NR cell on frequency F1 at operation 910. The V2X SIB may include at least one of NR V2X SL inter carrier frequency list, LTE V2X SL inter carrier frequency list, NR V2X SL configuration for serving frequency, or LTE V2X SL configuration for serving frequency. In addition, the V2X SIB may optionally include NR and/or LTE TX resource pool(s) for the listed frequency or the serving frequency. The UE determines, if F2 is serving frequency, and if F2 is included in NR V2X SL frequency list, and if NR V2X SL TX resource pool for F2 is received based on the received V2X SIB. It is assumed that in this case of FIG. 9, the V2X SIB includes NR V2X SL inter carrier frequency list, and the NR V2X SL inter carrier frequency list includes F2, but does not include NR V2X SL TX resource pool for F2. In the case of FIG. 9 that F2 is not serving frequency, and F2 is included in NR V2X SL frequency list received in V2X SIB, and NR V2X SL TX resource pool for F2 is not received, the UE initiates an NR RRC connection setup procedure at operation 920. After the RRC connection is setup at operation 920, the UE transmits a sidelink UE information message to the NR cell (i.e. gNB) on frequency F1 to indicate that UE is interested in NR V2X sidelink communication transmission or to request resources for NR V2X SL communication transmission at operation 930. The gNB configures NR V2X sidelink communication transmission resources, and transmits an RRC reconfiguration including information on the NR sidelink communication transmission resources to the UE at operation 940. In an embodiment, different sidelink UE information messages (e.g. LTE sidelink UE information message and NR sidelink UE information message) can be used for LTE V2X SL communication and NR V2X SL communication. Based on the received message (LTE sidelink UE information message and NR sidelink UE information message) gNB can identify whether UE is interested in LTE V2X sidelink communication transmission or NR V2X sidelink communication transmission and accordingly provide LTE V2X sidelink communication transmission or NR V2X sidelink communication transmission resources. Alternately, same sidelink UE information message can be used for the LTE V2X SL communication and the NR V2X SL communication wherein message includes separate fields/IEs for LTE V2X SL communication and NR V2X SL communication and UE includes them accordingly.

LTE Connection Initiation Triggers for V2X Sidelink Communication

There are two RATs for V2X sidelink communication. LTE V2X sidelink communication supports broadcast communication and caters limited V2X use cases. NR V2X sidelink communication supports unicast/broadcast/groupcast communication for advanced V2X uses cases. V2X services are mapped to NR and/or LTE sidelink. ENB (or LTE cell) can configure V2X sidelink communication configuration for NR sidelink, or eNB (or LTE cell) can configure V2X sidelink communication configuration for LTE sidelink, or eNB (or LTE cell) can configure V2X sidelink communication configuration for LTE sidelink and NR sidelink. LTE V2X SI includes the following to support the above configurations:

1. NR V2X SL inter carrier frequency list
    TX resource pool(s) for listed frequency is optionally included
2. LTE V2X SL inter carrier frequency list
    TX resource pool(s) for listed frequency is optionally included
3. NR V2X SL configuration for serving frequency
    TX resource pool(s) is optionally included
4. LTE V2X SL configuration for serving frequency
    TX resource pool(s) is optionally included Scenario 1: UE is camped on cell of second RAT (i.e. LTE) but interested in sidelink communication based on first RAT (i.e. NR) on the camped frequency.

Figure 10:
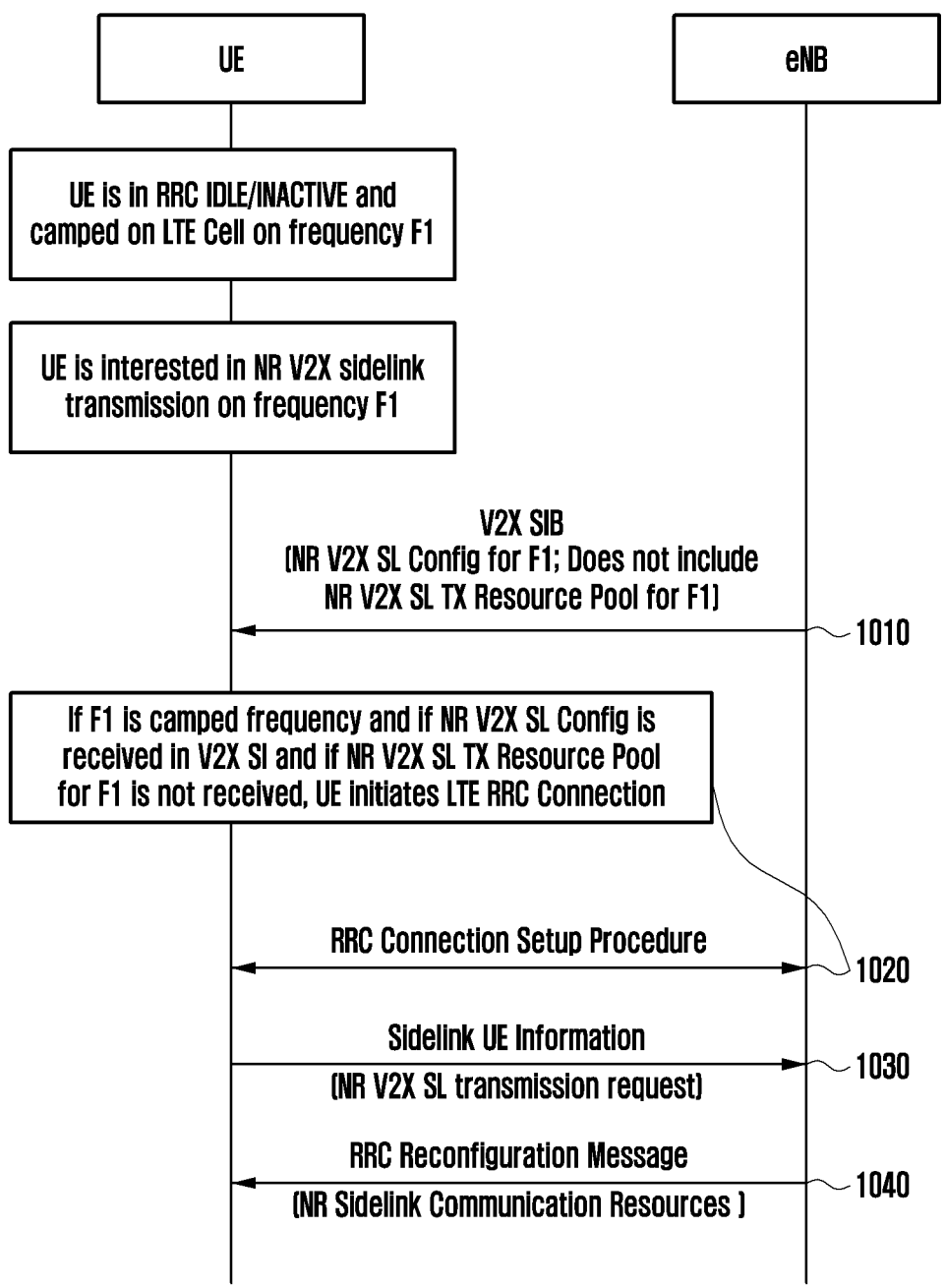
FIG. 10 illustrates a method for LTE connection initiation triggers for V2X sidelink communication according to an embodiment of the disclosure.

FIG. 10 illustrates a method for LTE connection initiation triggers for V2X sidelink communication according to an embodiment of the disclosure.

In one method of this disclosure as illustrated in FIG. 10, it is proposed that UE camped on an LTE cell, initiates an RRC connection on the LTE cell, if the frequency on which the UE is configured to transmit NR V2X sidelink communication concerns the camped frequency; and if the system information (i.e. V2X SIB) broadcasted by the camped cell includes NR V2X sidelink communication configuration for the camped frequency (i.e. frequency of LTE cell) but does not include transmission resource pool for NR V2X sidelink communication on the camped frequency.

Referring to FIG. 10, UE camped on an LTE cell on frequency F1 is in RRC_IDLE/INACTIVE state and interested in NR V2X sidelink transmission on frequency F1. The UE receives V2X SIB(s) from the LTE cell on frequency F1 at operation 1010. The V2X SIB(s) may include at least one of NR V2X SL inter carrier frequency list, LTE V2X SL inter carrier frequency list, NR V2X SL configuration for serving frequency, or LTE V2X SL configuration for serving frequency. In addition, the V2X SIB(s) may optionally include NR and/or LTE TX resource pool(s) for the listed frequency or the serving frequency. The UE determines, if F1 is the camped frequency, and if NR V2X SL configuration is received in V2X SIB, and if NR V2X SL TX resource pool for F1 is received based on the received V2X SIB. It is assumed that in this case of FIG. 10, the V2X SIB includes NR V2X SL configuration for F1 but does not include NR V2X SL TX resource pool for F1. In the case of FIG. 10 that F1 is the camped frequency, and NR V2X SL configuration is received in V2X SI, and NR V2X SL TX resource pool for F1 is not received, the UE initiates an LTE RRC connection setup/resume procedure at operation 1020. After the RRC connection is setup at operation 1020, the UE transmits a sidelink UE information message to the LTE cell (i.e. eNB) on frequency F1 to indicate that UE is interested in NR V2X sidelink communication transmission or to request NR V2X SL communication transmission at operation 1030. The eNB configures NR sidelink communication transmission resources, and transmits an RRC reconfiguration including information on the NR sidelink communication resources to the UE at operation 1040. It is to be noted different sidelink UE information messages (e.g. LTE sidelink UE information message and NR sidelink UE information message) can be used for LTE V2X SL communication and NR V2X SL communication. Alternately, same sidelink UE information message can be used for the LTE V2X SL communication and the NR V2X SL communication wherein message includes separate fields/IEs for LTE V2X SL communication and NR V2X SL communication and UE includes them accordingly.

Scenario 2: UE is camped on cell of second RAT (i.e. LTE) but interested in sidelink communication based on first RAT (i.e. NR) on frequency other than the camped frequency.

Figure 11:
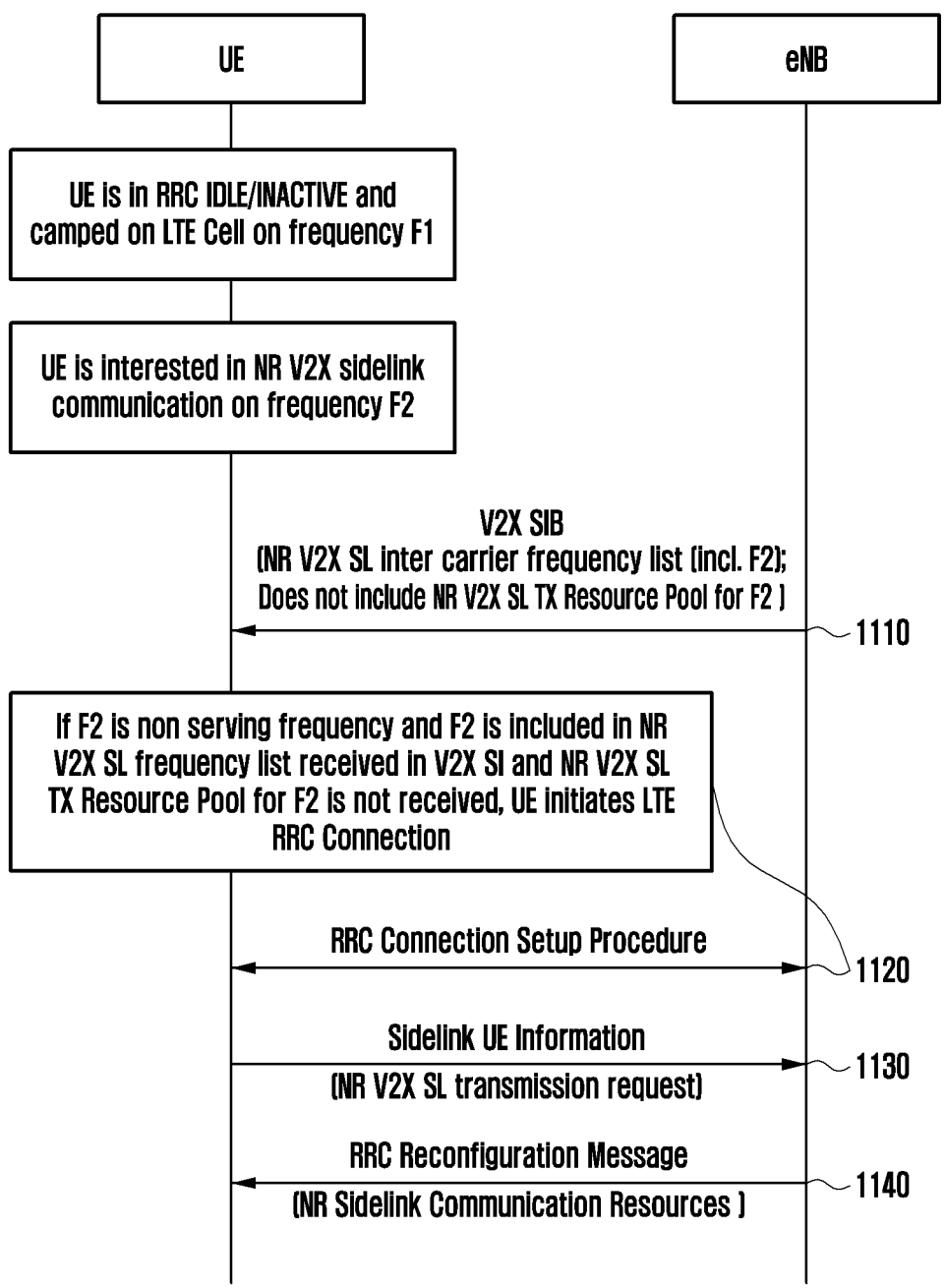
FIG. 11 illustrates another method for LTE connection initiation triggers for V2X sidelink communication according to an embodiment of the disclosure.

FIG. 11 illustrates another method for LTE connection initiation triggers for V2X sidelink communication according to an embodiment of the disclosure.

In one method of this disclosure as illustrated in FIG. 11, it is proposed that UE camped on an LTE cell, initiates an RRC connection on LTE cell, if the frequency on which the UE is configured to transmit NR V2X sidelink communication is included in V2X inter frequency information list for NR sidelink communication broadcasted in system information (i.e. V2X SIB) transmitted by LTE cell; and if the system information (i.e. V2X SIB) broadcasted by the camped cell does not include transmission resource pool for NR V2X sidelink communication on the concerned frequency.

Referring to FIG. 11, UE camped on an LTE cell on frequency F1 is in RRC_IDLE/INACTIVE state and interested in NR V2X sidelink transmission on frequency F2. The UE receives V2X SIB(s) from the LTE cell on frequency F1 at operation 1110. The V2X SIB may include at least one of NR V2X SL inter carrier frequency list, LTE V2X SL inter carrier frequency list, NR V2X SL configuration for serving frequency, or LTE V2X SL configuration for serving frequency. In addition, the V2X SIB may optionally include NR and/or LTE TX resource pool(s) for the listed frequency or the serving frequency. The UE determines, if F2 is serving frequency, and if F2 is included in NR V2X SL frequency list, and if NR V2X SL TX resource pool for F2 is received based on the received V2X SIB. It is assumed that in this case of FIG. 11, the V2X SIB includes NR V2X SL inter carrier frequency list, and the NR V2X SL inter carrier frequency list includes F2, but does not include NR V2X SL TX resource pool for F2. In the case of FIG. 11 that F2 is not serving frequency, and F2 is included in NR V2X SL frequency list received in V2X SIB, and NR V2X SL TX resource pool for F2 is not received, the UE initiates an LTE RRC connection setup/resume procedure at operation 1120. After the RRC connection is setup at operation 1120, the UE transmits a sidelink UE information message to the LTE cell (i.e. eNB) on frequency F1 to indicate that UE is interested in NR V2X sidelink communication transmission or to request NR V2X SL communication transmission at operation 1130. The eNB configures NR sidelink communication transmission resources, and transmits an RRC reconfiguration including information on the NR sidelink communication transmission resources to the UE at operation 1140. It is to be noted different sidelink UE information messages (e.g. LTE sidelink UE information message and NR sidelink UE information message) can be used for LTE V2X SL communication and NR V2X SL communication. Alternately, same sidelink UE information message can be used for the LTE V2X SL communication and the NR V2X SL communication wherein message includes separate fields/IEs for LTE V2X SL communication and NR V2X SL communication and UE includes them accordingly.

Scenario 3: UE is camped on cell of second RAT (i.e. LTE) and interested in sidelink communication based on second RAT (i.e. LTE) on the camped frequency.

In one method of this disclosure, it is proposed that UE camped on an LTE cell, initiates an RRC connection on the LTE cell, if the frequency on which the UE is configured to transmit LTE V2X sidelink communication concerns the camped frequency; and if the system information (i.e. V2X SIB) broadcasted by the camped cell includes LTE V2X sidelink configuration for the camped frequency but does not include transmission resource pool for LTE V2X sidelink communication on the camped frequency.

Scenario 4: UE is camped on cell of second RAT (i.e. LTE) and interested in sidelink communication based on second RAT (i.e. LTE) on frequency other than the camped frequency.

In one method of this disclosure, it is proposed that UE camped on an LTE cell, initiates an RRC connection on the LTE cell, if the frequency on which the UE is configured to transmit LTE V2X sidelink communication is included in V2X inter frequency information list for LTE sidelink communication broadcasted in system information (i.e. V2X SIB) transmitted by LTE cell; and if the system information (i.e. V2X SIB) broadcasted by the camped cell does not include transmission resource pool for LTE V2X sidelink communication on the concerned frequency.

In NR, bandwidth part (BWP) is defined for SL, and the same SL BWP is used for sidelink transmission and reception. In a licensed carrier, SL BWP is defined separately from Uu BWP. One SL BWP is (pre-)configured for RRC_IDLE and out-of-coverage NR V2X UEs in a carrier. For UEs in RRC_CONNECTED mode, one SL BWP is active in a carrier. No signaling is exchanged over SL for the activation or deactivation of a SL BWP. Only one SL BWP is configured in a carrier.

Figure 12:
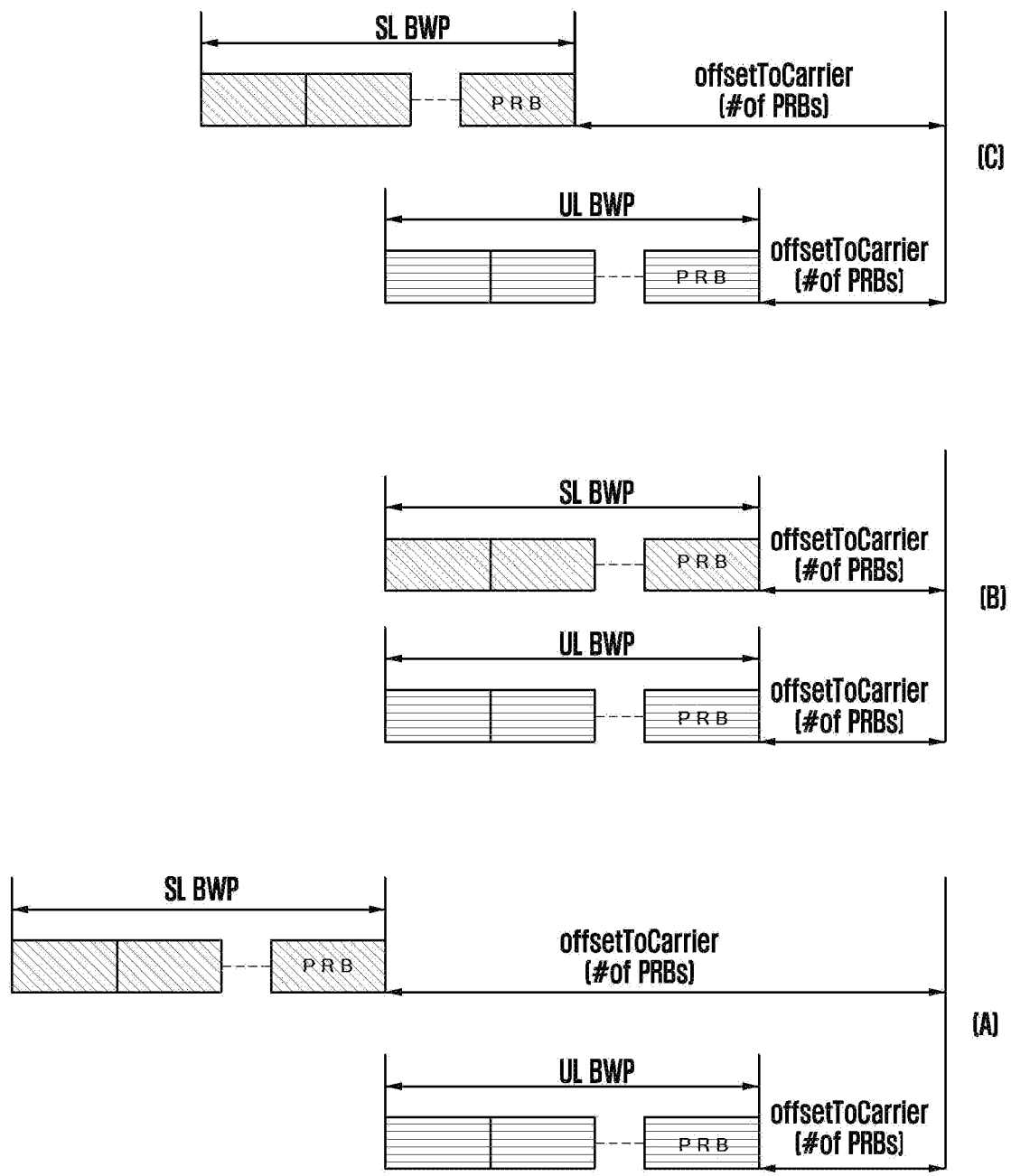
FIG. 12 shows sidelink (SL) bandwidth part (BWP) and uplink (UL) BWP depending on the configuration according to an embodiment of the disclosure.

FIG. 12 shows SL BWP and UL BWP depending on the configuration according to an embodiment of the disclosure.

Referring to FIG. 12, depending on the configuration, SL BWP and UL BWP can be a) non overlapping, b) fully overlapping or c) partial overlapping.

In LTE sidelink operation, when the UL transmission overlaps in time domain with V2X sidelink transmission in the same frequency (carrier), the UE prioritizes the V2X sidelink transmission over the UL transmission if the proximity services (ProSe) per packet priority (PPPP) of sidelink media access control (MAC) protocol data unit (PDU) is lower than a (pre)configured PPPP threshold; otherwise, the UE prioritizes the UL transmission over the V2X sidelink transmission.

In NR, in case of non-overlapping active SL BWP and active UL BWP even if the UL transmission overlaps in time domain with V2X sidelink transmission, depending on the UE capability, UE may or may not be able to transmit simultaneously on SL BWP and UL BWP on a carrier. If the UE can transmit simultaneously on SL BWP and UL BWP and sidelink MAC PDU meets certain criteria (e.g. priority is lower than a threshold, low value means high priority), it can reduce UL transmission power. If the UE cannot transmit simultaneously on SL BWP and UL BWP and sidelink MAC PDU meets certain criteria (e.g. priority value is lower than a threshold, low value means high priority), it can prioritize the V2X sidelink transmission over the UL transmission.

In case of overlapped active SL and UL BWPs on a carrier, UE cannot transmit both SL and UL transmission simultaneously. So, UE should prioritize between SL and UL transmission. UE prioritizes the V2X sidelink transmission over the UL transmission if sidelink MAC PDU meets certain criteria (e.g. priority is lower than a threshold, low value means high priority).

In an embodiment, if both mode 1 and mode 2 transmission resources are configured to UE, network can indicate for which traffic UE uses which transmission resource. Network can indicate communication type associated with each type (mode1/mode2) of transmission resources. For example, network can indicate that mode 1 transmission resources are to be used for unicast communication, whereas mode 2 transmission resources are to be used for broadcast/groupcast. So, UE will use the configured mode 1 and mode 2 resources accordingly.

Alternately, network can indicate QoS profiles/QoS flow IDs associated with each type (mode1/mode2) of transmission resources. For example, network can indicate that mode 1 transmission resources are to be used for QoS flows X/Y, whereas mode 2 transmission resources are for others. So, UE will use the configured mode 1 and mode 2 resources accordingly.

Alternately, network can indicate logical channels (LCHs) or logical channel groups (LCGs) associated with each type (mode1/mode2) of transmission resources. For example, network can indicate that mode 1 transmission resources are to be used for LCHs or LCGs X/Y, whereas mode 2 transmission resources are for others. So, UE will use the configured mode 1 and mode 2 resources accordingly.

Alternately, network can indicate priority associated with each type (mode1/mode2) of transmission resources. For example, network can indicate that mode 1 transmission resources are to be used for priorities X/Y, whereas mode 2 transmission resources are for others. So, UE will use the configured mode 1 and mode 2 resources accordingly.

Alternately, network can indicate priority threshold. For example, network can indicate that mode 1 transmission resources are to be used for logical channels with priorities lower than the priority threshold, whereas mode 2 transmission resources are for others. So, UE will use the configured mode 1 and mode 2 resources accordingly.

Source Layer 2 ID Transmission Mechanism

Figure 13:
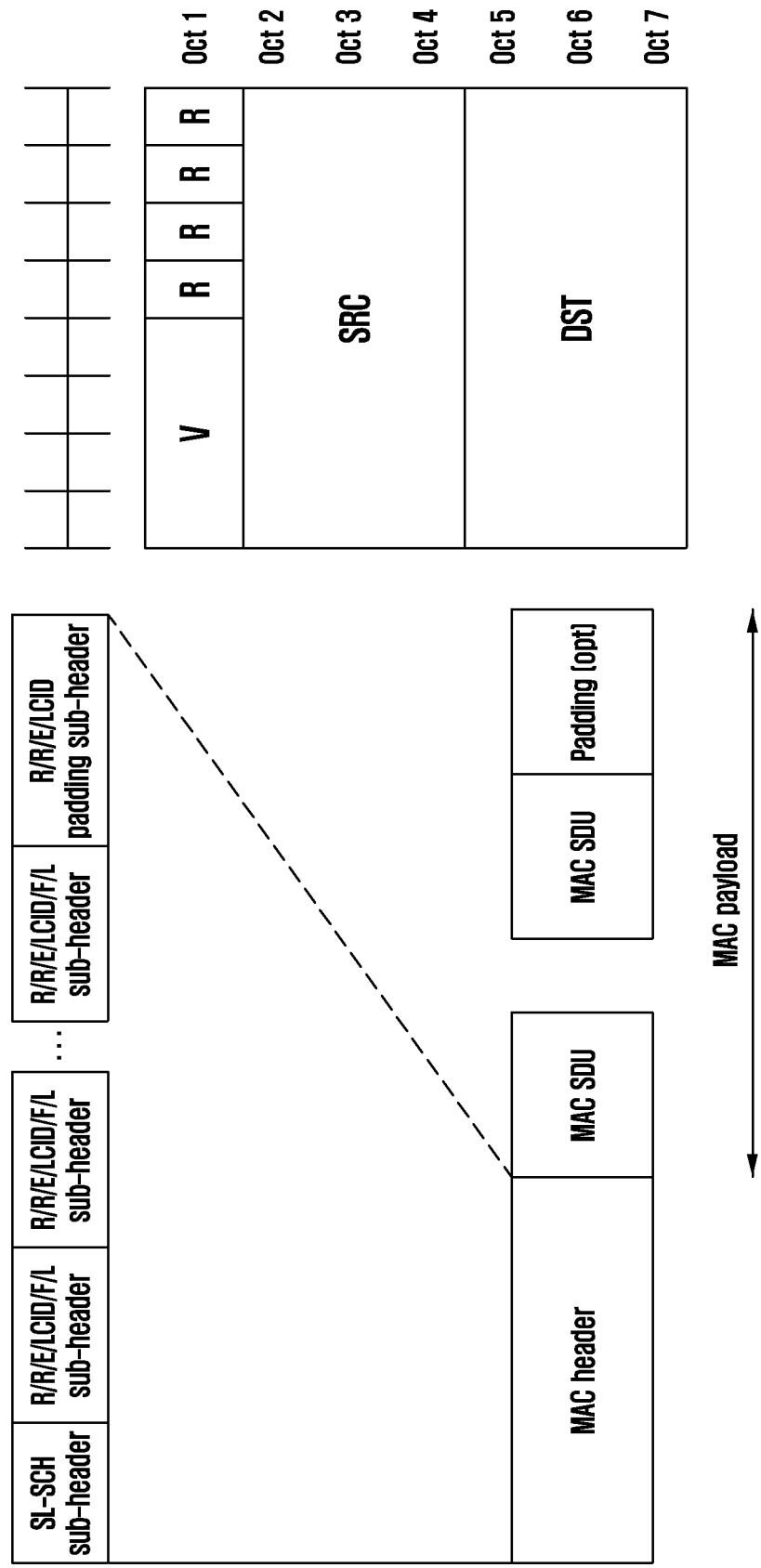
FIG. 13 shows an LTE sidelink media access control (MAC) protocol data unit (PDU) format according to an embodiment of the disclosure.

FIG. 13 shows an LTE sidelink MAC PDU format according to an embodiment of the disclosure.

Referring to FIG. 13, in LTE sidelink MAC PDU format, source layer-2 ID is always included in SL-shared channel (SCH) sub-header of every MAC PDU transmitted by V2X TX UE on sidelink. Source layer-2 ID is 24 bits and access stratum in UE receives source layer 2 ID from higher layer. Destination layer-2 ID is also included in SL-SCH sub-header of every MAC PDU transmitted by V2X TX UE on sidelink. Destination layer-2 ID is 24 bits and access stratum in UE receives destination layer 2 ID from higher layer.

Physical sidelink common control channel (PSCCH) and physical sidelink shared channel (PSSCH) are used for data TX/reception (RX). Sidelink control information (SCI) is transmitted on PSCCH. Transport block (includes MAC PDU) is transmitted on PSSCH.

LTE sidelink only supports broadcast communication for V2X sidelink communication. Hybrid automatic repeat request (HARQ) feedback is not supported and UE autonomously performs fixed number of retransmissions. NR V2X Sidelink communication supports unicast/groupcast/broadcast communication. NR V2X supports HARQ feedback for unicast/groupcast. HARQ feedback can be enabled/disabled. Considering the above characteristics of NR V2X communication, it is not efficient to always include source layer-2 ID in SL SCH MAC header. A method to determine whether to include source layer-2 ID in SL SCH MAC header or not is needed.

Method 1

Figure 14:
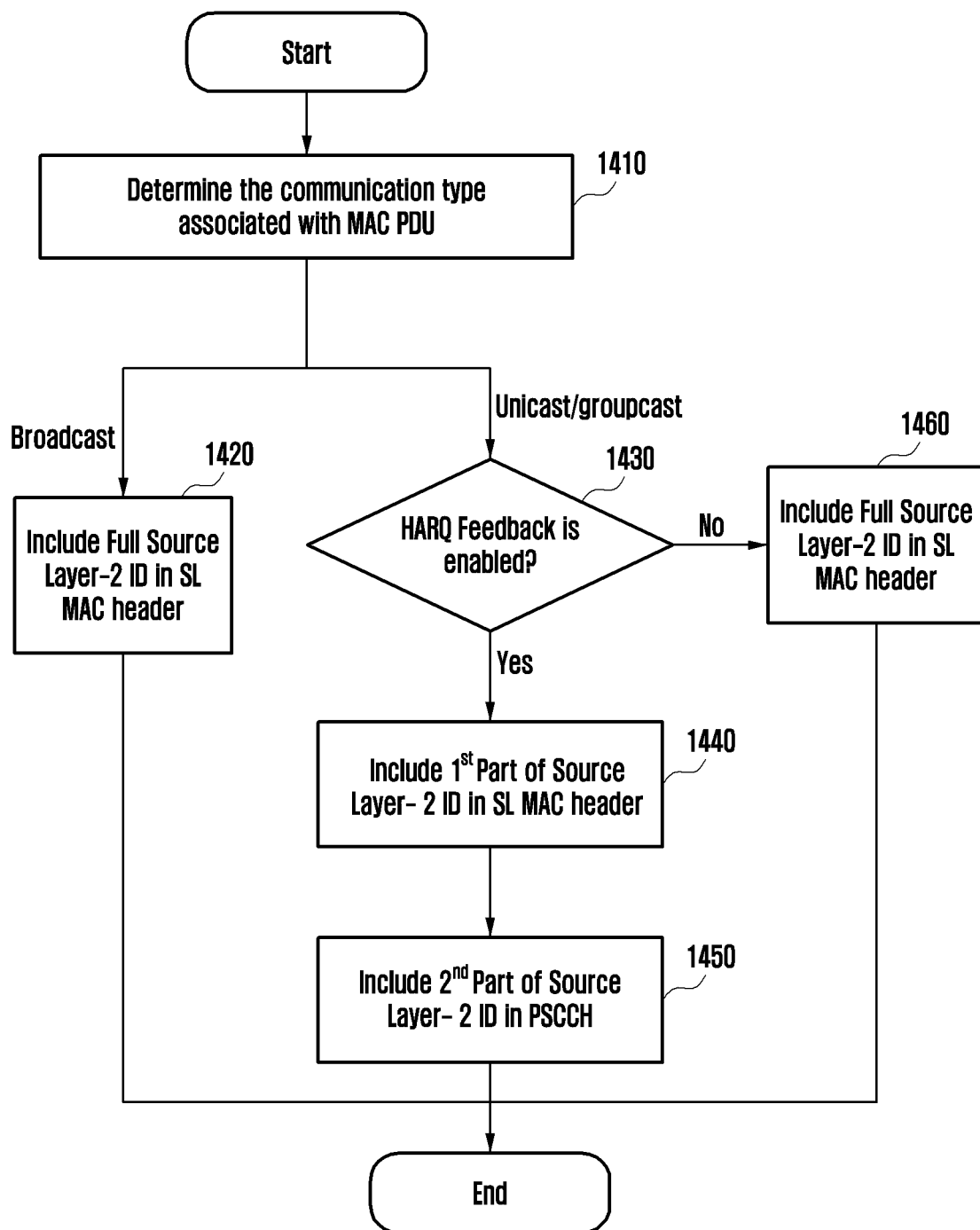
FIG. 14 illustrates a source layer 2 transmission mechanism according to an embodiment of the disclosure.

FIG. 14 illustrates a source layer 2 transmission mechanism according to an embodiment of the disclosure.

In one method of the disclosure as illustrated in FIG. 14, it is proposed that TX UE includes source layer 2 ID in MAC PDU and/or PSCCH based on communication type (broadcast or groupcast or unicast) associated with transmission and whether HARQ feedback is enabled or not for that communication type.

Referring to FIG. 14, TX UE determines the communication type associated with MAC PDU at operation 1410. If the MAC PDU corresponds to broadcast communication, the TX UE includes full source layer-2 ID in SL MAC header at operation 1420. The MAC PDU corresponds to broadcast communication if it includes MAC service data unit(s) (SDU(s)) of SL resource block(s) (RB(s))/LCHs associated with broadcast communication.

Else if MAC PDU corresponds to unicast communication, the TX UE determines whether HARQ feedback is enabled at operation 1430. If HARQ feedback is enabled for unicast communication, the TX UE partitions source layer-2 ID in two parts. The TX UE includes first part of source layer-2 ID in SL MAC header at operation 1440. The TX UE includes second part of source layer-2 ID in PSCCH at operation 1450. Second part of source layer-2 ID can be used to mask cyclic redundancy check (CRC) of PSCCH, or second part of source layer-2 ID can be included in SCI of PSCCH, or second part of source layer-2 ID can be further divided in two parts. One part is used to mask CRC of PSCCH and other part is included in SCI of PSCCH. In an embodiment, first part can be 'X' LSBs of source layer-2 ID and second part includes the remaining bits of source layer-2 ID. Else, i.e. if the HARQ feedback is disabled for unicast communication, the TX UE includes full source layer-2 ID in SL MAC header at operation 1460. MAC PDU corresponds to unicast communication if it includes MAC SDU(s) of SL RB(s)/LCHs associated with broadcast unicast communication.

Else if MAC PDU corresponds to groupcast communication, the TX UE determines whether HARQ feedback is enabled at operation 1430. If HARQ feedback is enabled for groupcast communication, the TX UE partitions source layer-2 ID in two parts. The TX UE includes first part of source layer-2 ID in SL MAC header at operation 1440. The TX UE includes second part of source layer-2 ID in PSCCH at operation 1450. Second part of source layer-2 ID can be used to mask CRC of PSCCH, or second part of source layer-2 ID can be included in SCI of PSCCH, or second part of source layer-2 ID can be further divided in two parts. One part is used to mask CRC of PSCCH and other part is included in SCI of PSCCH. In an embodiment, first part can be 'X' LSBs of source layer-2 ID and second part includes the remaining bits of source layer-2 ID. Else, i.e. if the HARQ feedback is disabled for groupcast communication, the TX UE includes full source layer-2 ID in SL MAC header at operation 1460. MAC PDU corresponds to groupcast communication if it includes MAC SDU(s) of SL RB(s)/LCHs associated with groupcast communication.

Whether HARQ feedback is enabled for unicast communication or not can be configured by gNB via system information or dedicated RRC signaling. Alternately, it can be pre-configured.

Whether HARQ feedback is enabled for groupcast communication or not can be configured by gNB via system information or dedicated RRC signaling. Alternately, it can be pre-configured.

In this method, depending on communication type (broadcast or groupcast or unicast) associated with transmission and whether HARQ feedback is enabled or not for that communication type, either full source layer-2 ID is included in MAC PDU or partial of source layer-2 ID as summarized in Table 1 below.

TABLE 1

| Communication Type | Source Layer-2 ID In SL SCH MAC Header |
|---|---|
| Broadcast (no HARQ feedback) | Full Source Layer-2 ID |
| Unicast with feedback | 1st Part of Source Layer-2 ID in MAC header |
| | 2nd Part of Source Layer-2 ID in PSCCH |
| Unicast without feedback | Full Source Layer-2 ID |
| Groupcast with feedback | 1st Part of Source Layer-2 ID in MAC header |
| | 2nd Part of Source Layer-2 ID in PSCCH |
| Groupcast without feedback | Full Source Layer-2 ID |

In order to enable receiver to determine whether MAC header includes full source layer-2 ID or partial source layer-2 ID following approaches are proposed:
1) One bit (or version number) in MAC header can indicate whether header includes full or part of source layer-2 ID.

2) One bit in SCI (PSCCH) can indicate whether SCI includes part of source layer-2 ID or not. Bit=1 indicates that SCI includes part of source layer-2 ID; and that MAC header includes other part. Bit=0 indicates that SCI does not include part of source layer-2 ID; and that MAC header includes full source layer-2 ID. Instead of including in SCI, this bit can be included in CRC mask.
3) One bit HARQ feedback type can be included in SCI (PSCCH). Bit=0 refers to no HARQ feedback, and indicates that MAC header includes full source layer-2 ID; and that SCI does not include part of source layer-2 ID. Bit=1 refers to HARQ feedback, and indicates that SCI includes part of source layer-2 ID; and that MAC header includes other part. Instead of including in SCI, this bit can be included in CRC mask.
4) SCI format X can be for case of HARQ feedback or for case where part of source layer-2 ID is included in SCI. SCI format Y can be used for other case (i.e. no HARQ feedback or MAC header includes full source layer-2 ID; SCI does not include part of source layer-2 ID).
5) Communication type (unicast, broadcast, groupcast) and HARQ feedback type (feedback or no feedback) can be included in PSCCH (in SCI and/or CRC).

Method 2

Figure 15:
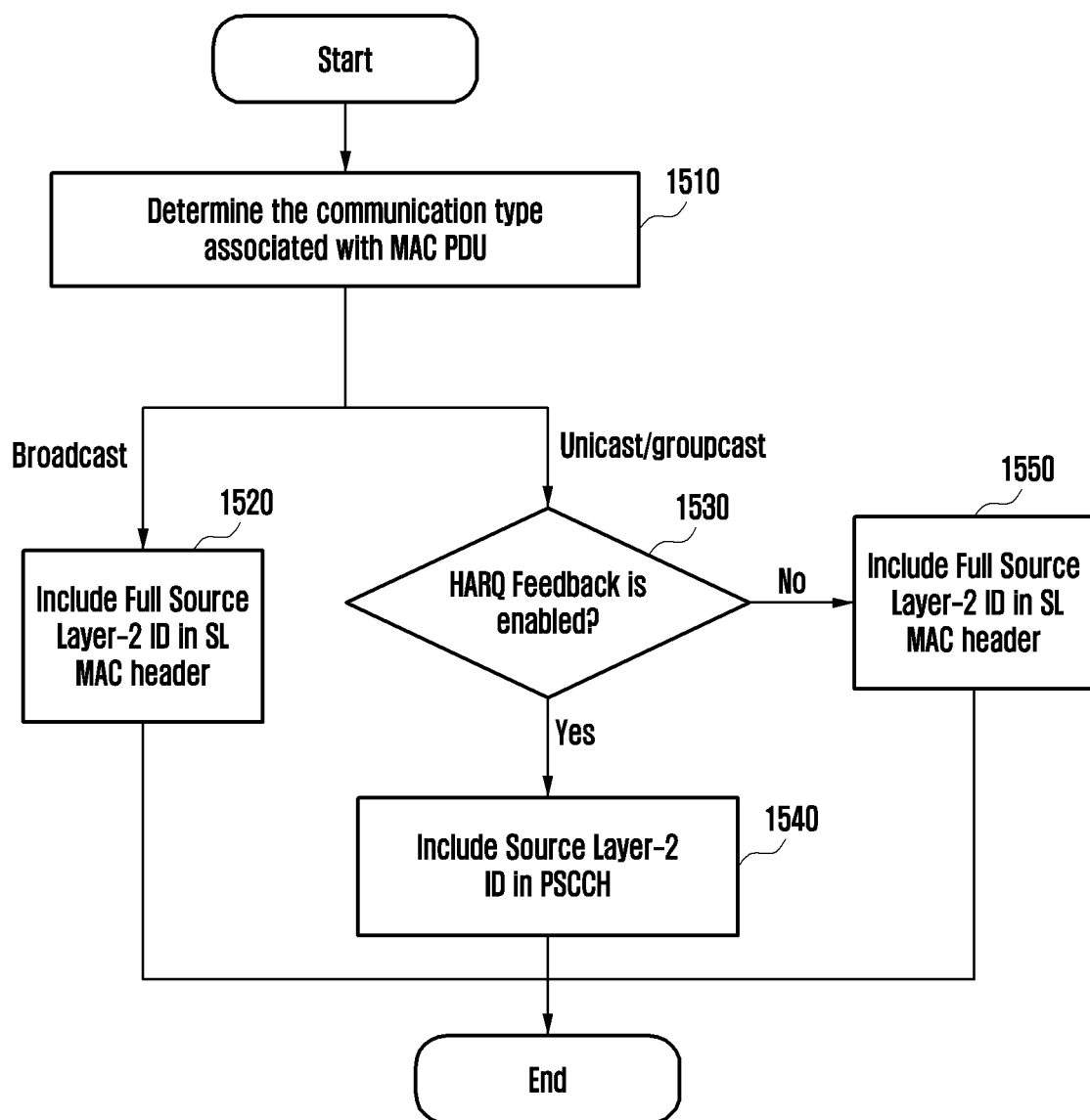
FIG. 15 illustrates another source layer 2 transmission mechanism according to an embodiment of the disclosure.

FIG. 15 illustrates another source layer 2 transmission mechanism according to an embodiment of the disclosure.

In one method of the disclosure as illustrated in FIG. 15, it is proposed that TX UE includes source layer-2 ID in MAC PDU and/or PSCCH based on communication type (broadcast or groupcast or unicast) associated with transmission and whether HARQ feedback is enabled or not for that communication type.

Referring to FIG. 15, TX UE determines the communication type associated with MAC PDU at operation 1510. If MAC PDU corresponds to broadcast communication, the TX UE includes full source layer-2 ID in SL MAC header at operation 1520. The MAC PDU corresponds to broadcast communication if it includes MAC SDU(s) of SL RB(s)/LCHs associated with broadcast communication.

Else if MAC PDU corresponds to unicast communication, the TX UE determines whether HARQ feedback is enabled at operation 1530. If HARQ feedback is enabled for unicast communication, the TX UE does not include source layer-2 ID in SL MAC header, and includes full source layer-2 ID in PSCCH at operation 1540. Else, i.e. if HARQ feedback is disabled for unicast communication, the TX UE includes full source layer-2 ID in SL MAC header at operation 1550. MAC PDU corresponds to unicast communication if it includes MAC SDU(s) of SL RB(s)/LCHs associated with unicast communication.

Else if MAC PDU corresponds to groupcast communication, the TX UE determines whether HARQ feedback is enabled at operation 1530. If HARQ feedback is enabled for groupcast communication, the TX UE does not include source layer-2 ID in SL MAC header, and includes full source layer-2 ID in PSCCH at operation 1540. Else, i.e. if HARQ feedback is disabled for groupcast communication, the TX UE includes full source layer-2 ID in SL MAC header at operation 1550. MAC PDU corresponds to unicast communication if it includes MAC SDU(s) of SL RB(s)/LCHs associated with groupcast communication.

In this method, depending on communication type (broadcast or groupcast or unicast) associated with transmission and whether HARQ feedback is enabled or not for that communication type, either full source layer-2 ID is included in MAC PDU or in PSCCH as summarized in Table 2 below.

TABLE 2

| Communication Type | Source Layer-2 ID In SL SCH MAC Header |
|---|---|
| Broadcast (no feedback) | Full Source Layer-2 ID in MAC Header |
| Unicast with feedback | Not present in MAC Header Full Source Layer-2 ID in PSCCH |
| Unicast without feedback | Full Source Layer-2 ID in MAC Header |
| Groupcast with feedback | Not present in MAC Header Full Source Layer-2 ID in PSCCH |
| Groupcast without feedback | Full Source Layer-2 ID in MAC Header |

In order to enable receiver to determine whether MAC header includes full source layer-2 ID or not following approaches are proposed:
1) One bit in MAC header can indicate whether MAC header includes full source layer-2 ID or not.
2) One bit in SCI (PSCCH) can indicate whether SCI includes full source layer-2 ID or not. Bit=1 indicates that SCI includes full source layer-2 ID; and that MAC header includes other part. Bit=0 indicates that SCI does not include source layer-2 ID; and that MAC header includes full source layer-2 ID. This bit can be included in CRC mask of PSCCH instead of SCI.
3) One bit HARQ feedback type can be included in SCI (PSCCH). Bit=0 refers to no HARQ feedback, and indicates that MAC header includes full source layer-2 ID; and that SCI does not include source layer-2 ID. Bit=1 refers to HARQ feedback, and indicates that SCI includes full source layer-2 ID; and that MAC header does not include source layer-2 ID. This bit can be included in CRC mask of PSCCH instead of SCI.
4) SCI format X can be for case of HARQ feedback or for case where source layer-2 ID is included in SCI. SCI format Y can be used for other case (i.e. no HARQ feedback or MAC header includes full source layer-2 ID; SCI does not include source layer-2 ID).
5) Communication type (unicast, broadcast, groupcast) and HARQ feedback type (feedback or no feedback) can be included in PSCCH (in SCI and/or CRC).

Whether HARQ feedback is enabled for unicast communication or not can be configured by gNB via system information or dedicated RRC signaling. Alternately, it can be pre-configured.

Whether HARQ feedback is enabled for groupcast communication or not can be configured by gNB via system information or dedicated RRC signaling. Alternately, it can be pre-configured.

Method 3

Figure 16:
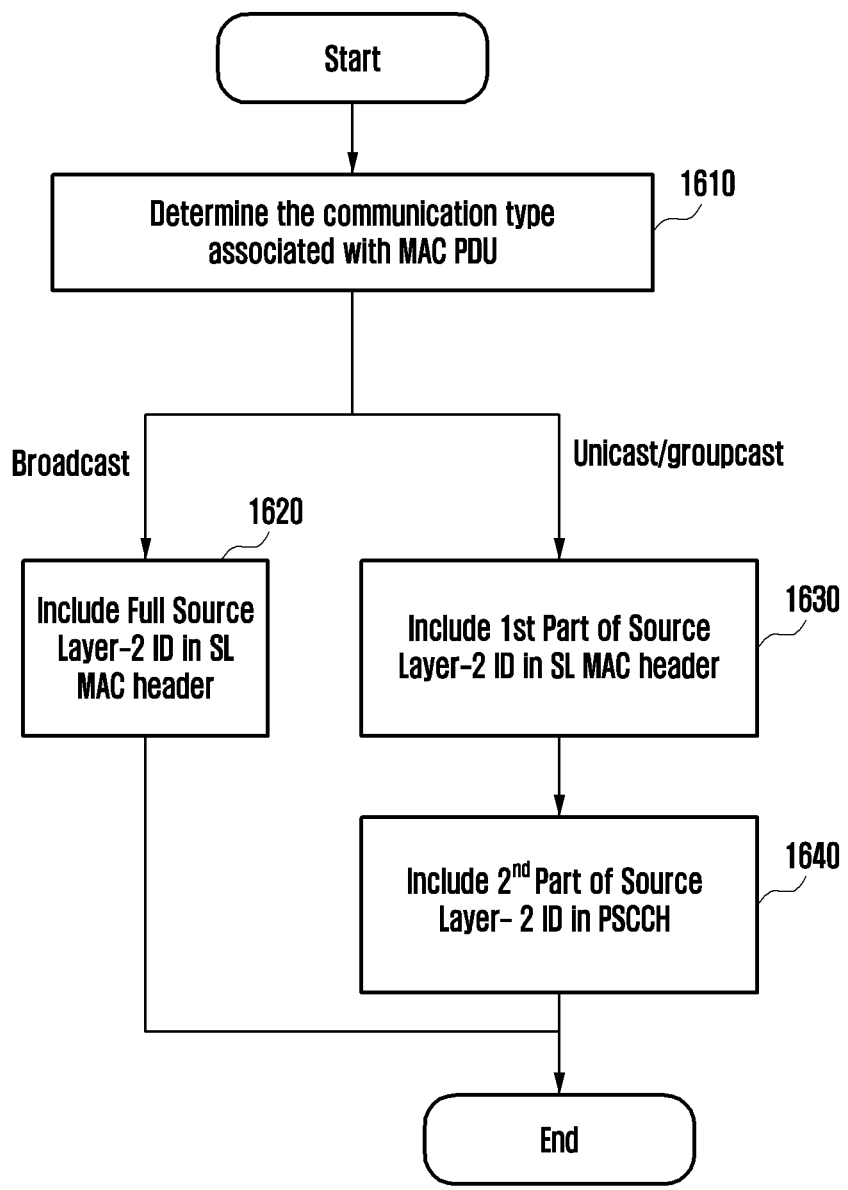
FIG. 16 illustrates another source layer 2 transmission mechanism according to an embodiment of the disclosure.

FIG. 16 illustrates another source layer 2 transmission mechanism according to an embodiment of the disclosure.

In one method of the disclosure as illustrated in FIG. 16, it is proposed that TX UE includes source layer-2 ID in MAC PDU and/or PSCCH based on communication type (broadcast or groupcast or unicast) associated with transmission.

Referring to FIG. 16, TX UE determines the communication type associated with MAC PDU at operation 1610. If MAC PDU corresponds to broadcast communication, the TX UE includes full source layer-2 ID in SL MAC header at operation 1620. The MAC PDU corresponds to broadcast communication if it includes MAC SDU(s) of SL RB(s)/LCHs associated with broadcast communication.

Else if MAC PDU corresponds to unicast or groupcast communication, the TX UE partitions source layer-2 ID in two parts. The TX UE includes first part of source layer-2 ID in SL MAC header at operation 1630. The TX UE includes second part of source layer-2 ID in PSCCH at operation 1640. Second part of source layer-2 ID can be used to mask CRC of PSCCH, or second part of source layer-2 ID can be included in SCI of PSCCH, or second part of source layer-2 ID can be further divided in two parts. One part is used to mask CRC of PSCCH and other part is included in SCI of PSCCH. In an embodiment, first part can be 'X' LSBs of source layer-2 ID and second part includes the remaining bits of source layer-2 ID. MAC PDU corresponds to unicast or groupcast communication if it includes MAC SDU(s) of SL RB(s)/LCHs associated with unicast or groupcast communication respectively.

In this method, depending on communication type (broadcast or groupcast or unicast) associated with transmission, either full or partial source layer-2 ID is included in MAC PDU as summarized in Table 3 below.

TABLE 3

| Communication Type | Source Layer-2 ID in SL SCH MAC Header |
|---|---|
| Broadcast | Full Source Layer-2 ID in MAC header |
| Unicast | 1st Part of Source Layer-2 ID in MAC header |
|  | 2nd Part of Source Layer-2 ID in PSCCH |
| Groupcast | 1st Part of Source Layer-2 ID in MAC header |
|  | 2nd Part of Source Layer-2 ID in PSCCH |

In order to enable receiver to determine whether MAC header includes full source layer-2 ID or partial source layer-2 ID following approaches are proposed:
1) One bit in MAC header can indicate whether header includes full or part of source layer-2 ID.
2) One bit in SCI (PSCCH) can indicate whether SCI includes part of source Layer-2 ID or not. Bit=1 indicates that SCI includes part of source layer-2 ID; and that MAC header includes other part. Bit=0 indicates that SCI does not include part of source layer-2 ID; and that MAC header includes full source layer-2 ID. This bit can be included in CRC mask of PSCCH instead of SCI.
3) SCI format X can be for case where part of source layer-2 ID is included in SCI. SCI format Y can be used for other case (i.e. MAC header includes full Source Layer-2 ID; SCI does not include source layer-2 ID).
4) Communication type (unicast, broadcast, groupcast) can be included in PSCCH (in SCI and/or CRC).

Method 4

In one method of the disclosure, it is proposed that TX UE includes source layer-2 ID in MAC PDU and/or PSCCH based on communication type (broadcast or groupcast or unicast) associated with transmission.

If MAC PDU corresponds to broadcast communication, the TX UE includes full source layer-2 ID in SL MAC header.

Else if MAC PDU corresponds to unicast or groupcast communication, the TX UE does not include source layer-2 ID in SL MAC header. The TX UE includes full source layer-2 ID in PSCCH.

In this method, depending on communication type (broadcast or groupcast or unicast) source layer-2 ID is included or not included in MAC PDU as summarized in Table 4 below.

TABLE 4

| Communication Type | Source Layer-2 ID in SL SCH MAC Header |
|---|---|
| Broadcast | Full Source Layer-2 ID in MAC header |
| Unicast | Not present in MAC Header |
|  | Full Source Layer-2 ID in PSCCH |
| Groupcast | Not present in MAC Header |
|  | Full Source Layer-2 ID in PSCCH |

In order to enable receiver to determine whether MAC header includes full source layer-2 ID or partial source layer-2 ID following approaches are proposed:
1) One bit in MAC header can indicate whether header includes full source layer-2 ID or not.
2) One bit in SCI (PSCCH) can indicate whether SCI includes full source layer-2 ID or not. Bit=1 indicates that SCI includes source layer-2 ID; and that MAC header does not include source layer-2 ID. Bit=0 indicates that SCI does not include source layer-2 ID; and that MAC header includes full source layer-2 ID. This bit can be included in CRC mask of PSCCH instead of SCI.
3) SCI format X can be for case where source layer-2 ID is included in SCI. SCI format Y can be used for other case (i.e. MAC header includes full source layer-2 ID; SCI does not include source layer-2 ID).
4) Communication type (unicast, broadcast, groupcast) can be included in PSCCH (in SCI and/or CRC).

In one method, irrespective of whether MAC PDU corresponds to unicast or groupcast or broadcast communication, the TX UE does not include source layer-2 ID in SL MAC header. The TX UE includes full source layer-2 ID in PSCCH.

Resources for HARQ Retransmissions

In NR V2X sidelink communication, HARQ feedback is supported for unicast and groupcast communication.

Scenario: Transmitter, i.e. TX UE is in coverage and gNB configures mode 1 resource for transmission.

Basic Operation: UE transmits SL buffer status report (BSR) to gNB. TX UE receives physical downlink control channel (PDCCH) addressed to SL V2X radio network temporary identifier (SL-V-RNTI) from gNB wherein downlink control information (DCI) indicates resource for SL transmission. UE generates the MAC PDU. UE transmits PSCCH. UE transmits SL transport block (TB) (incl. MAC PDU) on PSSCH. RX UE sends SL HARQ feedback (HARQ-acknowledge (ACK) or HARQ-negative ACK (NACK)) on physical SL feedback channel (PSFCH).

Issue: In case TX UE receives sidelink HARQ-NACK from RX UE, the issue is how to perform HARQ retransmission, e.g. how the TX UE obtains resource for HARQ retransmission.

Method 1: In one method of the disclosure, it is proposed that gNB configures scheduling request (SR) resource(s) for requesting SL grant for HARQ retransmission. In case multiple SR configurations are signaled for SL, gNB can indicate which of these SR configuration(s) are used for requesting SL grant for HARQ retransmission. Upon receiving sidelink HARQ-NACK from RX UE, UE transmits SR in SR resource configured for requesting SL grant for HARQ retransmission. Upon receiving SR, gNB transmits PDCCH indicating SL grant for HARQ retransmission.

Figure 17:
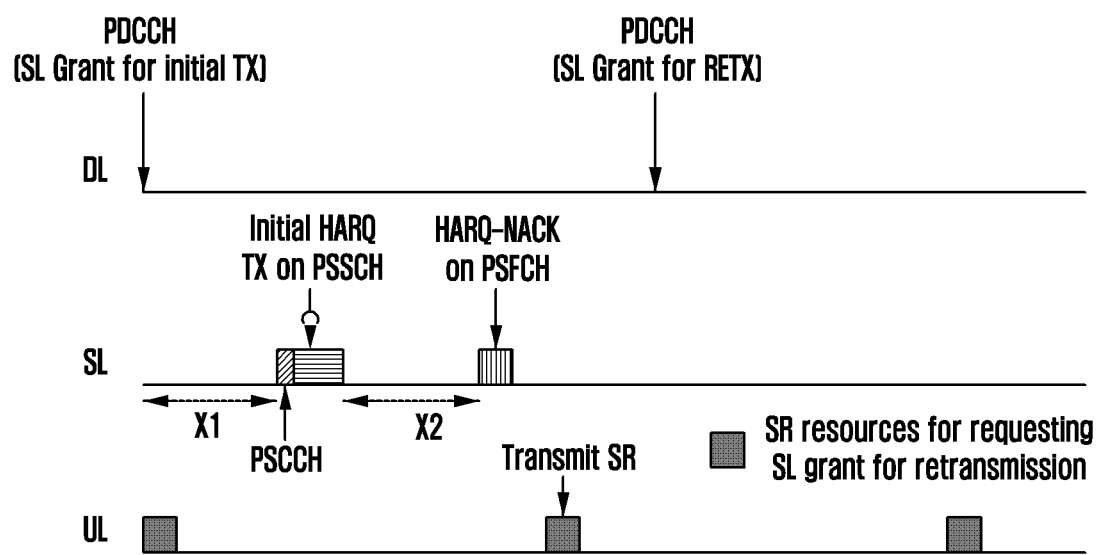
FIGS. 17, 19, 20, 21, 22, 23 and 24 illustrate the timelines of operations for requesting SL grant for retransmission according to various embodiments of the disclosure.
Figure 18:
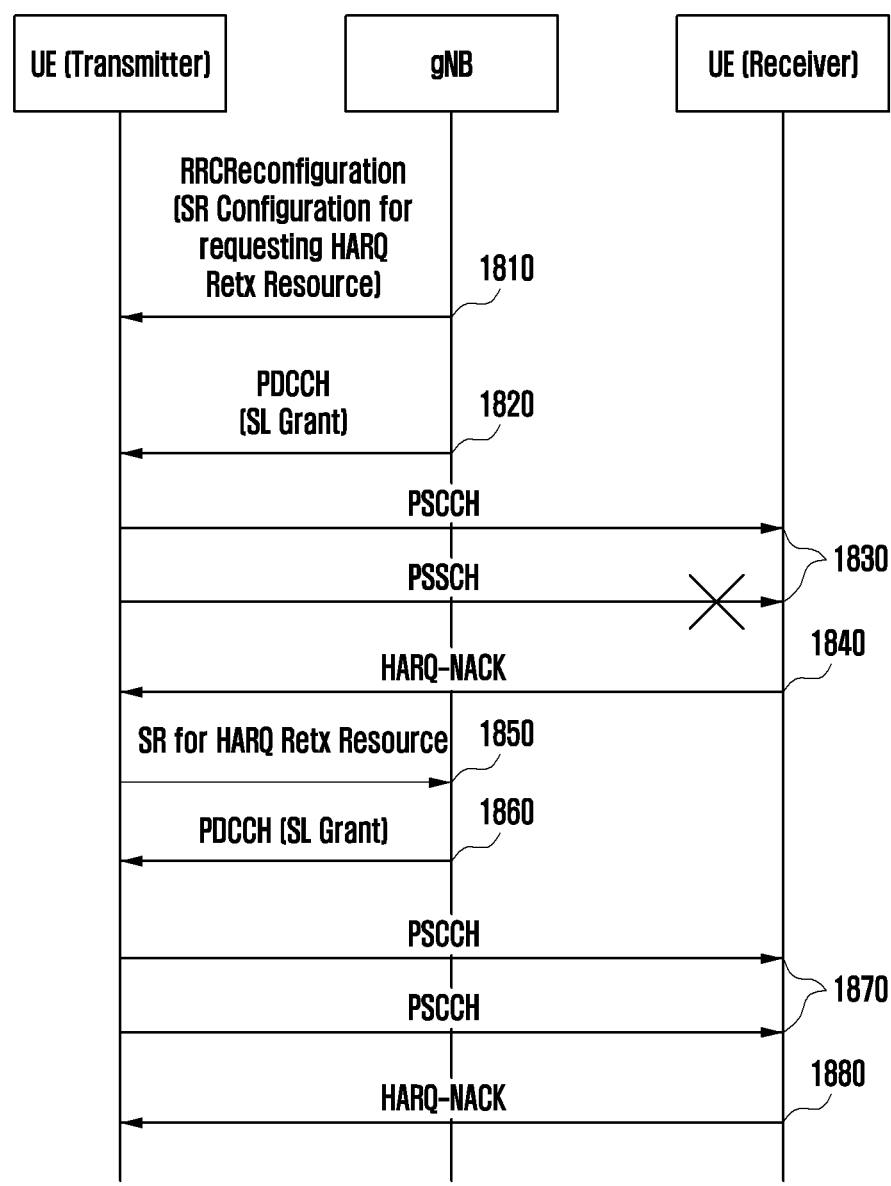
FIG. 18 is the signaling flow between transmitter UE, receiver UE and gNB according to an embodiment of the disclosure.

FIG. 17 illustrates the timeline of an operation for requesting SL grant for retransmission and FIG. 18 is a corresponding signaling flow between transmitter UE, receiver UE and gNB according to an embodiment of the disclosure.

Referring to FIG. 18, gNB transmits an RRC reconfiguration message to TX UE at operation 1810. The RRC reconfiguration message includes SR configuration for requesting HARQ retransmission resource, e.g. information on SR resources for retransmission. The gNB transmits an SL grant on PDCCH at operation 1820. The TX UE transmits control information on PSCCH and SL TB on PSSCH to RX UE based on the SL grant at operation 1830. If the RX UE fails to receive the SL TB from the TX UE, the RX UE transmits SL HARQ-NACK to the TX UE at operation 1840. If the TX UE receives HARQ-NACK from the RX UE, the TX UE transmits SR for HARQ retransmission resource to the gNB based on the SR configuration at operation 1850. The gNB transmits an SL grant on PDCCH at operation 1860. The TX UE transmits control information on PSCCH and SL TB on PSSCH to the RX UE based on the SL grant at operation 1870. If the RX UE receives the SL TB from the TX UE, the RX UE transmits SL HARQ-ACK to the TX UE at operation 1880.

If gNB allocates multiple SL grants one after another, on receiving SR, gNB may not be able to identify for which SL grant UE is requesting for retransmission.

Figure 19:
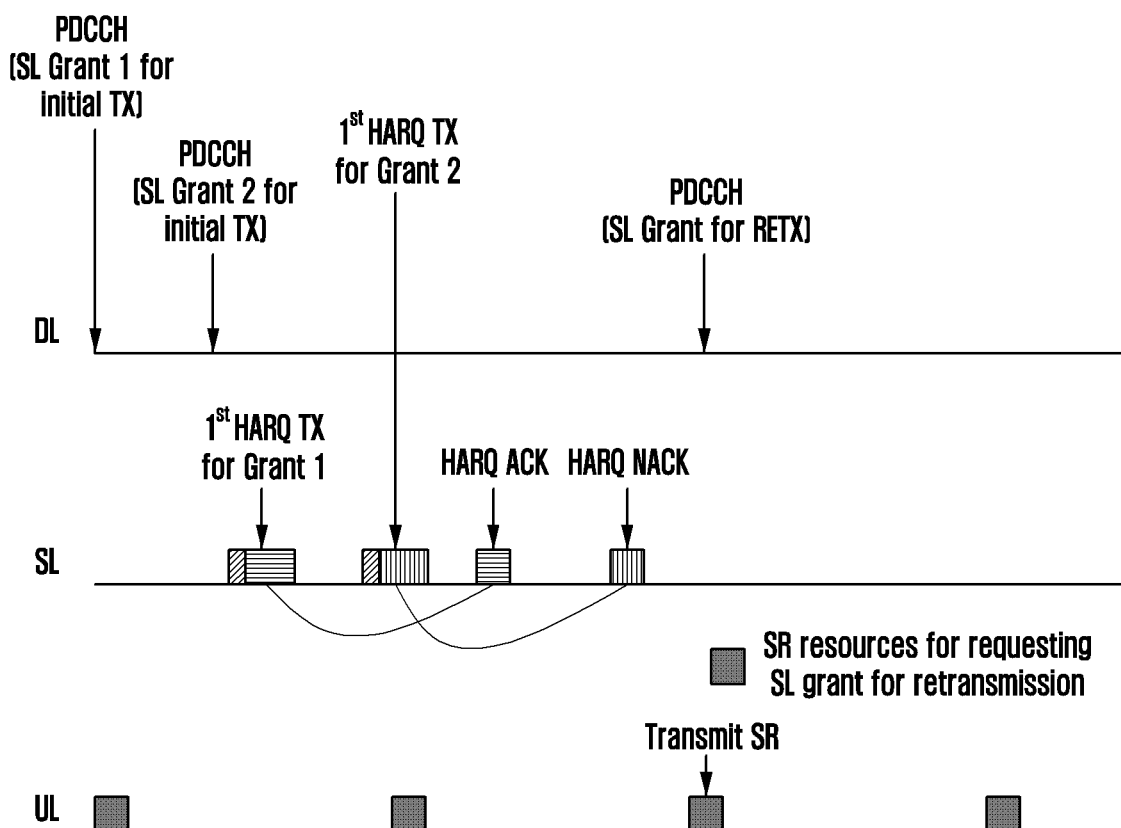

FIG. 19 illustrates the timeline of an operation for requesting SL grant for retransmission according to an embodiment of the disclosure.

Referring to FIG. 19, gNB has allocated two SL grants, and TX UE has transmitted two transport blocks to receiver UE based on these SL grants. TX UE receives HARQ-ACK for transmission based on SL grant 1 and receives HARQ-NACK for transmission based on SL grant 2. Upon receiving sidelink HARQ-NACK from RX UE, UE transmits SR in SR resource configured for requesting SL grant for HARQ retransmission. However, upon receiving SR, gNB cannot identify whether the SR is for HARQ retransmission resource request for SL grant 1 or SL grant 2.

Figure 20:
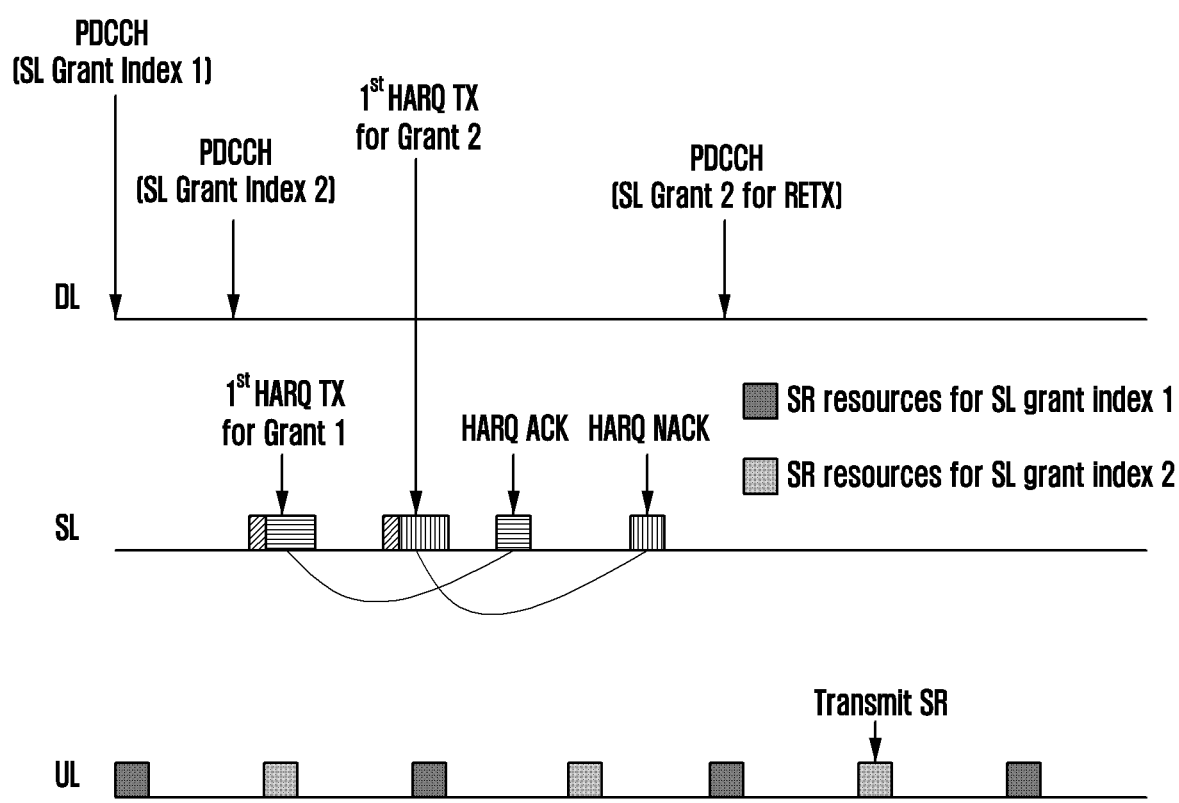

To overcome the above issue, it is proposed in this disclosure to include grant index in DCI allocating SL grant as illustrated in the timeline of FIG. 20. In particular, referring to FIG. 20, SR configuration(s) to be used for requesting SL grant for HARQ retransmission are linked to grant index. gNB indicates which SR configuration(s) is for which grant index(s). Upon receiving sidelink HARQ-NACK for HARQ transmission corresponding to a SL grant with grant index x, UE transmits SR in SR resource of SR configuration corresponding to the grant index x.

HARQ-NACK is received for transmission corresponding to grant index 2, so UE transmits SR using SR resource of SR configuration linked to grant index 2. The earliest available SR resource from SR configuration liked to grant index 2 is used for SR transmission.

To overcome the above issue, in another embodiment it is proposed that each SL HARQ feedback is associated with first available (i.e. not associated with any other HARQ feedback and present after the location (in time) of HARQ feedback) SR resource for SR configuration for requesting HARQ retransmission.

Figure 21:
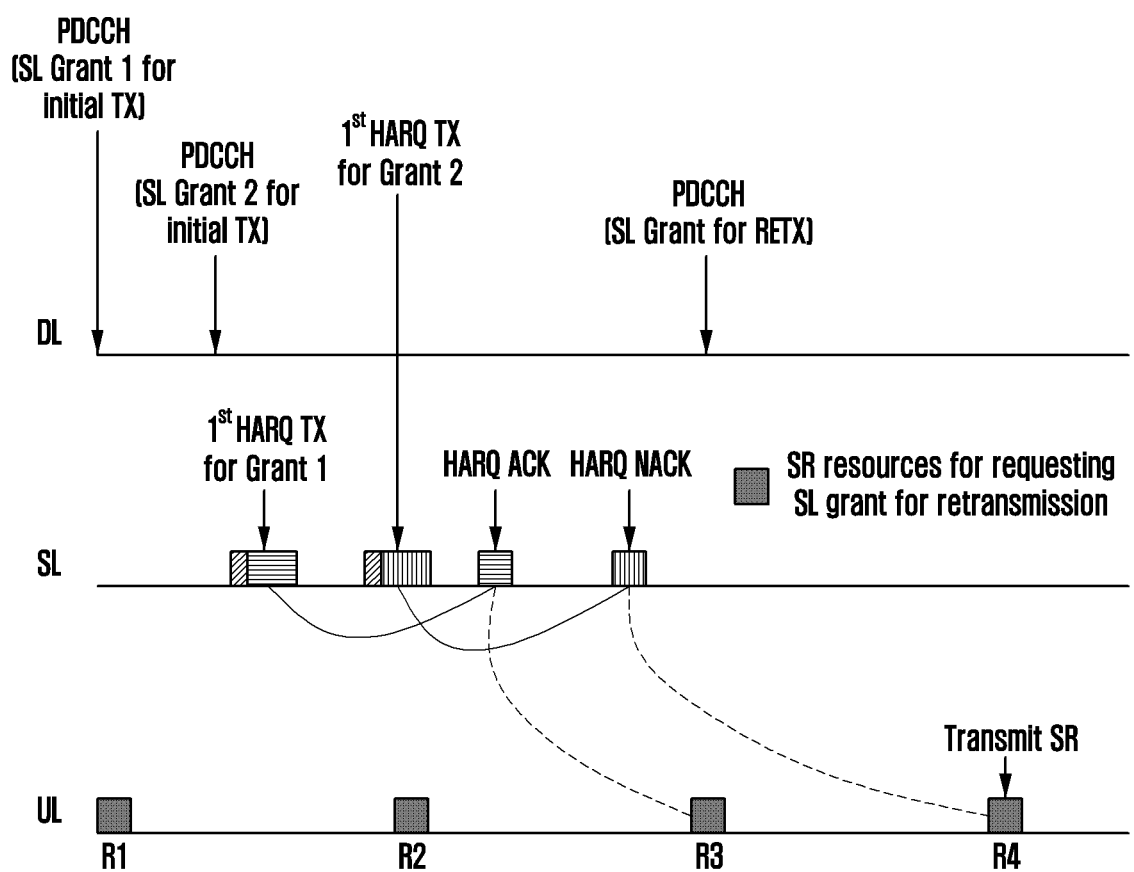

FIG. 21 illustrates the timeline of an operation for requesting SL grant for retransmission according to an embodiment of the disclosure.

Referring to FIG. 21, HARQ feedback for transmission based on SL grant 1 is associated with SR resource R3. HARQ feedback for transmission based on SL grant 2 is associated with SR resource R4. Note that SR resource R3 occurs in time after HARQ feedback for transmission based on SL grant 2 but is not available as it is associated with HARQ feedback for transmission based on SL grant 1. So, upon receiving HARQ-NACK for transmission based on SL grant 2, UE transmits SR in SR resource R4.

To overcome the above issue in another embodiment, it is proposed that interval between SL grants is at least greater than or equal to periodicity of SR resource in SR configuration for requesting HARQ retransmission. Upon receiving SL HARQ-NACK, UE transmits SR in earliest available SR resource from SR configuration for requesting HARQ retransmission.

Method 2: In another method of the disclosure it is proposed, upon receiving sidelink HARQ-NACK, UE sends MAC control element (CE) to gNB for requesting SL grant for HARQ retransmission.

Figure 22:
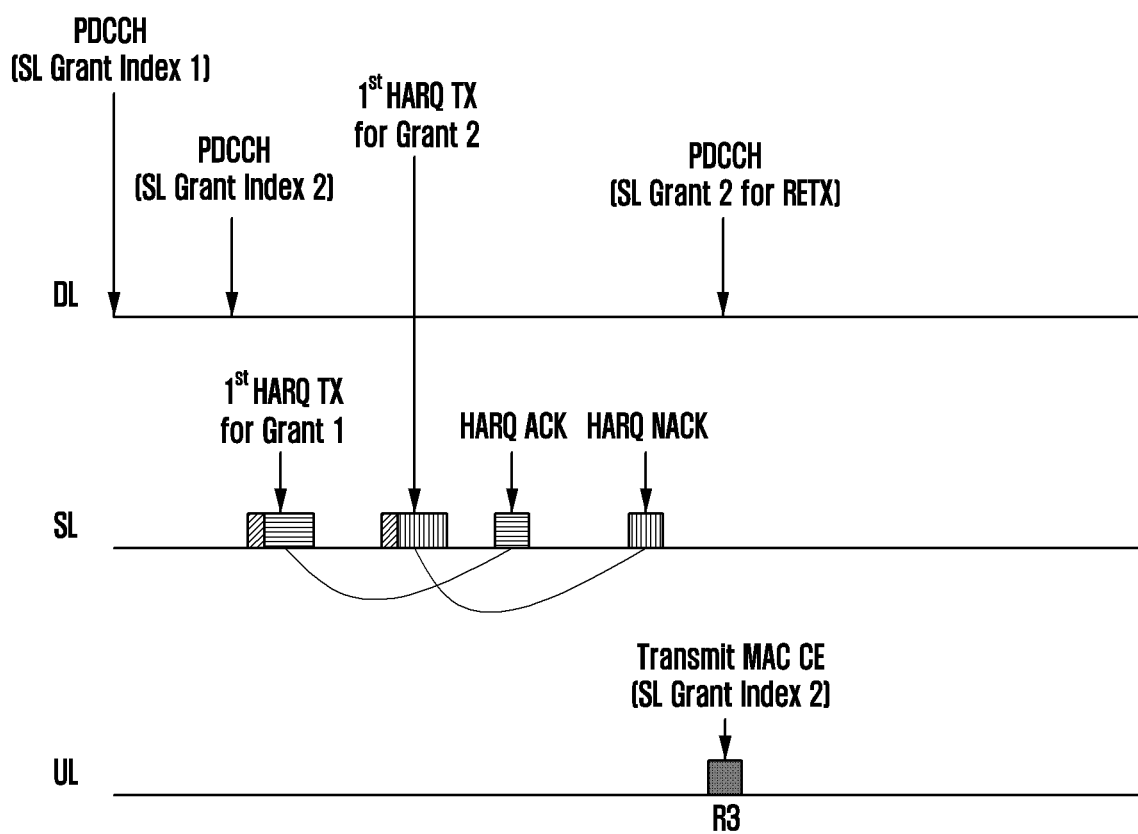

FIG. 22 illustrates the timeline of an operation for requesting SL grant for retransmission according to an embodiment of the disclosure.

MAC CE includes SL grant index (grant index is included in DCI scheduling SL grant), or MAC CE includes system frame number (SFN)/slot/symbol of SL grant corresponding to which UE is requesting transmission. MAC CE can include request for retransmission for multiple SL grants.

Referring to FIG. 22, HARQ-NACK is received for transmission corresponding to grant index 2, so UE transmits MAC CE including grant index 2.

Method 3: In another method of the disclosure, it is proposed that gNB configures both mode 1 (i.e. dedicated resources) and mode 2 resources (common TX resources, resource selection based on sensing) to UE. Upon receiving sidelink HARQ-NACK for transmission based on mode 1 grant, UE selects resource from mode 2 resource pool for HARQ retransmission. In another embodiment, upon receiving sidelink HARQ-NACK for transmission based on mode 1 grant, UE selects resource from mode 2 resource pool if it fails to receive mode 1 SL grant within a (pre-) configured time.

Method 4: In another method of the disclosure, it is proposed that gNB autonomously provides SL grants for HARQ retransmission. gNB configures SR resource(s) for stopping SL grant for HARQ retransmission. SR configuration(s) to be used for stopping SL grant for HARQ retransmission are linked to grant index. gNB indicates which SR configuration(s) is for which grant index(s). Upon receiving sidelink HARQ-ACK for HARQ transmission corresponding to a SL grant with grant index x, UE transmit SR in SR resource of SR configuration corresponding to grant index x.

Figure 23:
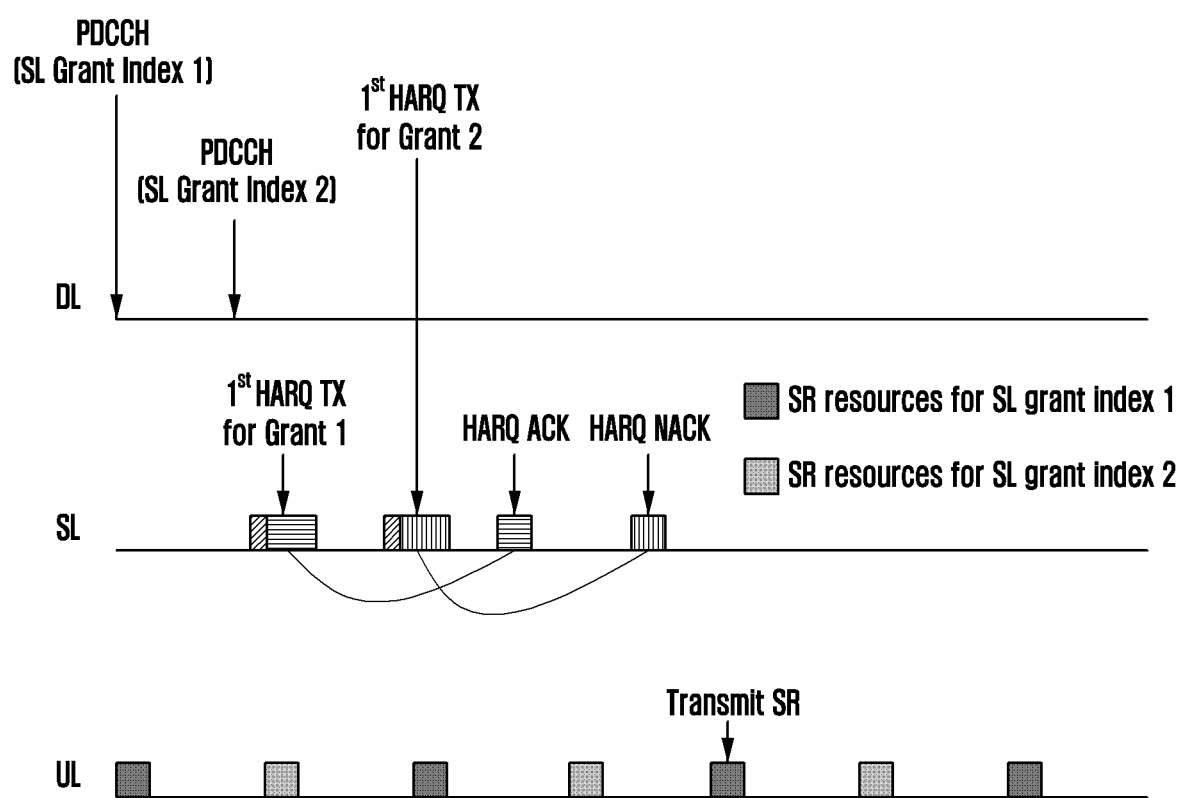

FIG. 23 illustrates the timeline of an operation for requesting SL grant for retransmission according to an embodiment of the disclosure.

Referring to FIG. 23, HARQ-ACK is received for transmission corresponding to grant index 1, so UE transmits SR in SR resource of SR configuration corresponding to grant index 1.

In an alternate embodiment, upon receiving sidelink HARQ-ACK, UE sends MAC CE to gNB for stopping SL grant for HARQ retransmission. MAC CE includes SL grant index, or MAC CE includes SFN/slot/symbol of SL grant corresponding to which UE is requesting to stop giving grants for retransmission.

Figure 24:
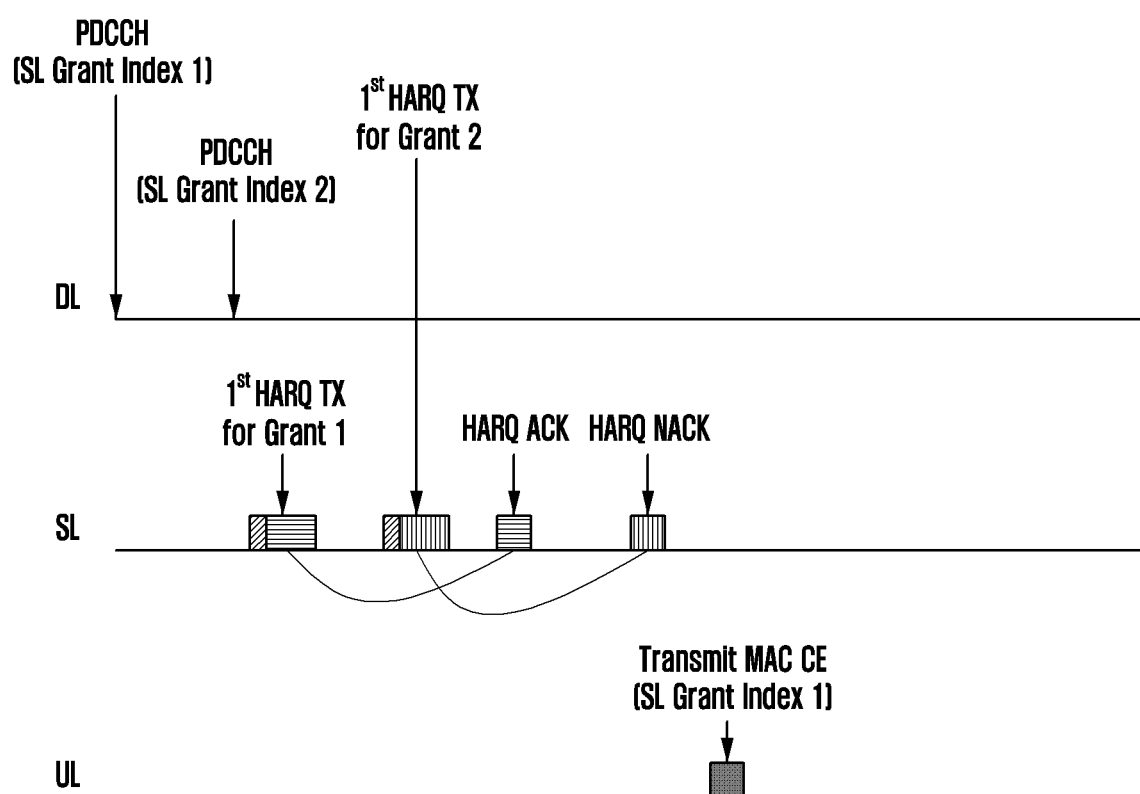

FIG. 24 illustrates the timeline of an operation for requesting SL grant for retransmission according to an embodiment of the disclosure.

Referring to FIG. 24, HARQ-ACK is received for transmission corresponding to grant index 1, so UE transmits MAC CE including grant index 1.

It is to be noted that above methods can also be used for mode 1 configured grants for sidelink. Instead of grant index, configured grant configuration index is used. Each configured grant configuration is associated with index. It can be explicitly signaled, or it is the index of entry in configuration list.

SL RBs/LCHs and SL RB Configurations for NR Sidelink

For SL unicast, groupcast and broadcast, QoS parameters of V2X packets are instructed by the upper layers to the access stratum (AS).

Unicast Communication: In the transmitter, upper layers map the packet(s) to PC5 QoS flow(s) via PC5 QoS rules, and pass the packet(s) down to the AS with associated QoS flow identifier(s) (i.e. PC5 QoS flow identifier (QFI)). AS obtains SL radio bearer (SLRB) configurations via gNB/ng-eNB or via pre-configuration. These SLRB configurations include PC5 QoS flow to SLRB mapping, service data adaptation protocol (SDAP)/packet data convergence protocol (PDCP)/radio link control (RLC)/LCH configurations, etc. The UE in the AS establishes SLRB(s) associated with the PC5 QFI(s) of the packet(s), and maps available packet(s) to the SLRB(s) established.

Groupcast/Broadcast Communication: In the transmitter, the PC5 QoS profile of each arriving V2X packet are set by the upper layers and submitted to the AS. AS obtains SLRB configurations via gNB/ng-eNB or via pre-configuration. These SLRB configurations may include PC5 QoS profile to SLRB mapping, PDCP/RLC/LCH configurations, etc. The UE in the AS establishes SLRB(s) associated with the QoS profile of the packet(s), and maps the packet(s) to the SLRB(s) established.

For SL unicast, the mapping between PC5 QoS flows and SLRB configurations is at least gNB configured via dedicated signaling or pre-configured. Similarly, for SL groupcast/broadcast, the mapping between PC5 QoS profile and SLRB configurations is at least gNB configured via dedicated signaling or pre-configured.

In an embodiment, for a UE in RRC IDLE/INACTIVE state, if the SI broadcasted by the camped cell provides transmission resources for frequency on which the UE is configured to transmit V2X sidelink unicast communication and the mapping between PC5 QoS flows and SLRB configurations is not broadcasted in system information, UE uses the pre-configured mapping between PC5 QoS flows and SLRB configurations. If mapping between PC5 QoS flows and SLRB configurations is broadcasted in system information, UE uses this mapping acquired from SI.

In another embodiment, for a UE in RRC IDLE/INACTIVE state, if the SI broadcasted by the camped cell provides transmission resources for frequency on which the UE is configured to transmit V2X sidelink unicast communication and the mapping between PC5 QoS flows and SLRB configurations is not broadcasted in system information, UE initiates the RRC connection. After initiating the connection, UE obtains the mapping between PC5 QoS flows and SLRB configurations from gNB in dedicated signaling. If mapping between PC5 QoS flows and SLRB configurations is broadcasted in system information, UE uses this mapping acquired from SI.

For unicast/groupcast communication, SL RB configurations can be pre-configured or configured by gNB using dedicated RRC signaling or via system information. It is assumed that transmitter can provide the SL RB configuration(s) to the receiver(s) during the connection setup.

Scenario: UE is in RRC_CONNECTED state.

For a communication type (e.g. unicast), packets arrive for destination 1. In the transmitter, upper layers map the packet(s) to PC5 QoS flow X and pass the packet(s) down to the AS with associated QoS flow identifier(s) (i.e. PC5 QFI X).

AS sends SLRB configuration request to gNB.

gNB provides SLRB configuration 1. The SLRB configuration 1 is mapped to PC5 QFI X and includes SDAP/PDCP/RLC/LCH configurations, etc.

The UE in the AS establishes SLRB 1 associated with the PC5 QFI X for destination 1 based on SLRB configuration 1. Packets of PC5 QFI X for destination 1 are mapped to this SL RB.

Sometime later, for unicast communication packets arrive for destination 2. In the transmitter, upper layers map the packet(s) to PC5 QoS flow X based on QoS rules and pass the packet(s) down to the AS with associated QoS flow identifier(s) (i.e. PC5 QFI X).

In this scenario, there are two options:

Option 1: UE sends SLRB configuration request to gNB including destination ID and PC5 QFI. gNB provides SL RB configuration 2. The SLRB configuration 2 is mapped to PC5 QFI X and includes SDAP/PDCP/RLC/LCH configurations, etc. The UE in the AS establishes SLRB associated with the PC5 QFI X for destination 2 based on SLRB configuration 2.

Option 2: UE does not send SLRB configuration request to gNB. The UE in the AS establishes SLRB 2 associated with the PC5 QFI X for destination 2 based on SLRB configuration 1. Packets of PC5 QFI X for destination 2 are mapped to this SL RB. For a given communication type (e.g. unicast, groupcast), upon receiving the first packet of a PC5 QoS flow/QoS profile from upper layer for a destination, if UE has SLRB configuration corresponding to that PC5 QoS flow/QoS profile and communication type, UE establishes a new SLRB using the SLRB configuration corresponding to that PC5 QoS flow/QoS profile and communication type. Otherwise, UE sends SLRB configuration request to gNB.

Figure 25:
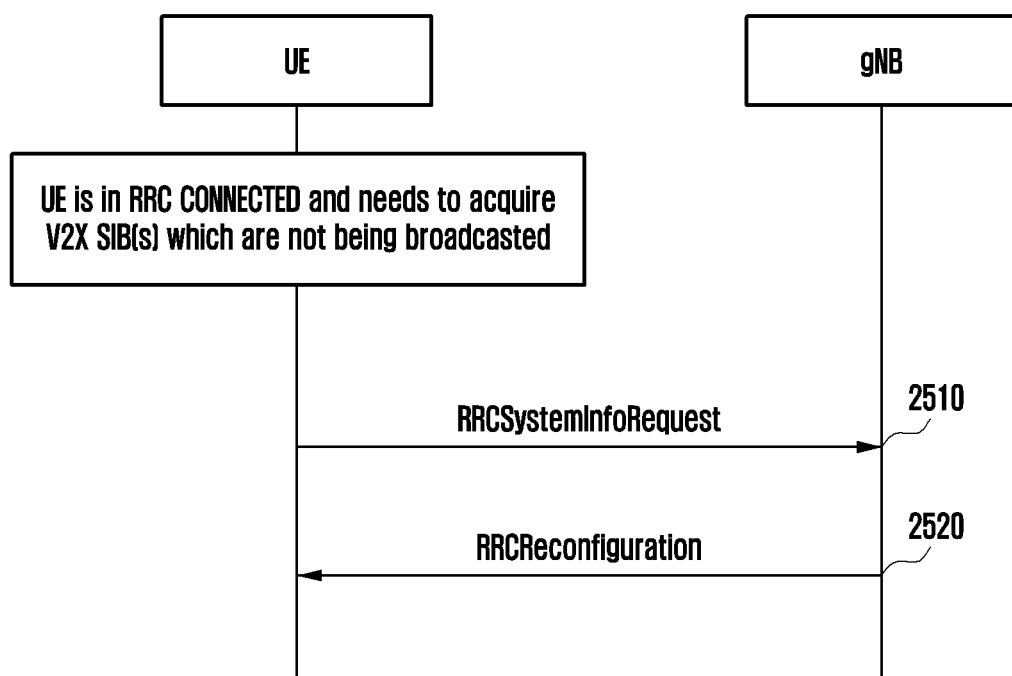
FIGS. 25 and 26 are the signaling flows between UE and gNB for acquiring V2X SIB(s) according to embodiments of the disclosure.
Figure 26:
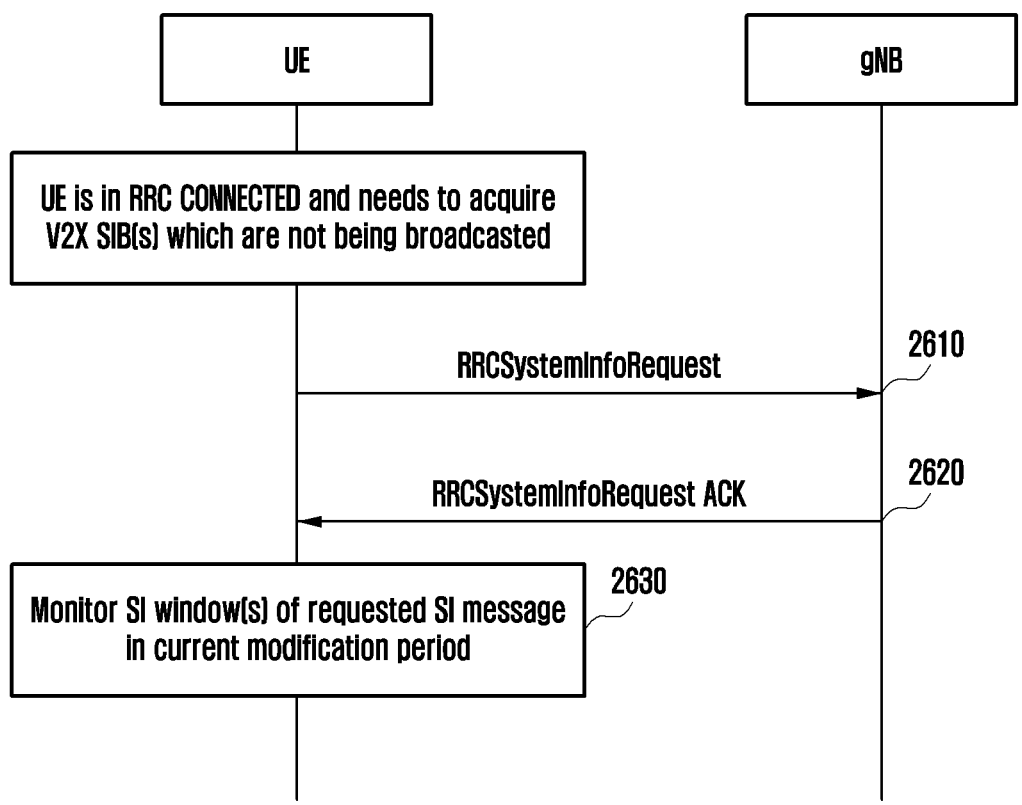

FIGS. 25 and 26 are the signaling flows between UE and gNB for acquiring V2X SIB(s) according to various embodiments of the disclosure.

In NR, SI framework whether an SI message is broadcasted or provided on demand is up to network implementation. Whether SI message is being broadcasted or provided on demand is indicated in SIB1. If SI message including the V2X SIB(s) is not being broadcasted (i.e. provided on demand), RRC_CONNECTED UE acquires V2X SIB(s).

Referring to FIG. 25, UE is in RRC_CONNECTED and needs to acquire V2X SIB(s) which are not being broadcasted. The UE transmits an RRCSystemInfoRequest message to gNB at operation 2510. The RRCSystemInfoRequest message is transmitted over dedicated control channel (DCCH). The RRCSystemInfoRequest includes request for SI message(s) which are associated with V2X SIBs or includes request for V2X SIB(s). Mapping between V2X SIBs and SI messages is indicated in SIB1. The gNB transmits an RRC reconfiguration message to the UE at operation 2520. The RRC reconfiguration message includes the requested V2X SIB(s) or SI message(s). gNB may also broadcast SI message(s) including the requested V2X SIB(s) in SI windows. So, after transmitting RRCSystemInfoRequest in RRC_connected state, UE also monitors SI windows corresponding to the requested SI messages or corresponding to SI messages of the requested V2X SIB(s).

In case of embodiment based on FIG. 25, after initiating transmission of RRCSystemInfoRequest, UE waits for acknowledgment for SI request only if UE is in RRC IDLE/INACTIVE state. UE does not wait for acknowledgment for SI request if UE is in RRC_CONNECTED state. RRCSystemInfoRequest in RRC_IDLE/INACTIVE is transmitted over common control channel (CCCH) and includes request for SI message(s) which are associated with V2X SIBs. Upon transmitting RRCSystemInfoRequest over CCCH, UE receives the requested SI messages in corresponding SI windows.

Referring to FIG. 26, UE is in RRC_CONNECTED and needs to acquire V2X SIB(s) which are not being broadcasted. The UE transmits an RRCSystemInfoRequest message to gNB at operation 2610. The gNB transmits an RRCSystemInfoRequest ACK to the UE at operation 2620. The UE monitors SI window(s) of requested SI message in current modification period at operation 2630.

In case of embodiment based on FIG. 26, after initiating transmission of RRCSystemInfoRequest, UE waits for acknowledgment for SI request from lower layers (contention resolution MAC CE acts as SI request ACK) if UE is in RRC_IDLE/INACTIVE state. RRCSystemInfoRequest is transmitted by IDLE/INACTIVE UE using CCCH. After receiving RRCSystemInfoRequest in message 3 (Msg3) in CCCH SDU, gNB transmits contention resolution MAC CE acknowledging reception of SI request. If UE is in RRC_CONNECTED state, it waits for RRCSystemInfoRequest ACK message. RRCSystemInfoRequest is transmitted by RRC_CONNECTED UE using DCCH. After receiving RRCSystemInfoRequest in DCCH, gNB transmits RRCSystemInfoRequestAck acknowledging reception of SI request.

In an embodiment of FIG. 25, UE can start a timer upon initiating transmission of RRCSystemInfoRequest. Timer is stopped upon receiving RRCReconfiguration message including requested SI. If timer expires UE initiate transmission of RRCSystemInfoRequest again. Upon failure to receive desired SI after transmitting RRCSystemInfoRequest for 'N' times, UE may declare radio link failure (RLF). N can be configured in SI or dedicated signaling or pre-defined.

Figure 27:
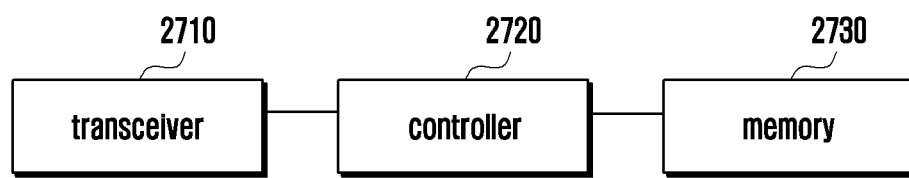
FIG. 27 is a block diagram of a terminal according to an embodiment of the disclosure.

FIG. 27 is a block diagram of a terminal according to an embodiment of the disclosure.

Referring to FIG. 27, a terminal includes a transceiver 2710, a controller 2720 and a memory 2730. The controller 2720 may refer to a circuitry, an ASIC, an FPGA, or at least one processor. The transceiver 2710, the controller 2720 and the memory 2730 are configured to perform the operations of the UE illustrated in the figures, e.g. FIGS. 1 to 26, or as otherwise described above. Although the transceiver 2710, the controller 2720 and the memory 2730 are shown as separate entities, they may be integrated onto a single chip. The transceiver 2710, the controller 2720 and the memory 2730 may also be electrically connected to or coupled with each other.

The transceiver 2710 may transmit and receive signals to and from other network entities, e.g., a base station.

The controller 2720 may control the UE to perform functions according to the embodiments described above. For example, the controller 2720 is configured to control the transceiver 2710 to receive system information including sidelink communication information of second RAT. In a scenario, UE is camped on a cell of first RAT (i.e. NR) but interested in sidelink communication based on second RAT (i.e. LTE) on the camped frequency. The controller 2720 is configured to initiate an RRC connection on the camped cell of the first RAT for sidelink communication according to second RAT: if the frequency on which the UE is configured to transmit sidelink communication according to second RAT concerns the camped frequency; and if the system information broadcasted by the camped cell of first RAT does not include transmission resources for sidelink communication according to second RAT. In another scenario, UE is camped on a cell of first RAT (i.e. NR) but interested in sidelink communication based on second RAT (i.e. LTE) on frequency other than the camped frequency. The controller 2720 is configured to initiate an RRC connection on the camped cell of the first RAT for sidelink communication according to second RAT: if the frequency on which the UE is configured to transmit sidelink communication according to second RAT is included in system information broadcasted by the camped cell of first RAT and does not include transmission resource pool for sidelink communication according to second RAT for that frequency. The controller 2720 is configured to control the transceiver 2710 to transmit a sidelink UE information message for sidelink communication according to second RAT to camped cell of first RAT. The controller 2720 is configured to control the transceiver 2710 to receive information on resources for sidelink communication according to second RAT in the dedicated signaling. In another scenario, the first RAT may refer to LTE and the second RAT may refer to NR.

In an embodiment, the operations of the terminal may be implemented using the memory 2730 storing corresponding program codes. Specifically, the terminal may be equipped with the memory 2730 to store program codes implementing desired operations. To perform the desired operations, the controller 2720 may read and execute the program codes stored in the memory 2730 by using a processor or a central processing unit (CPU).

Figure 28:
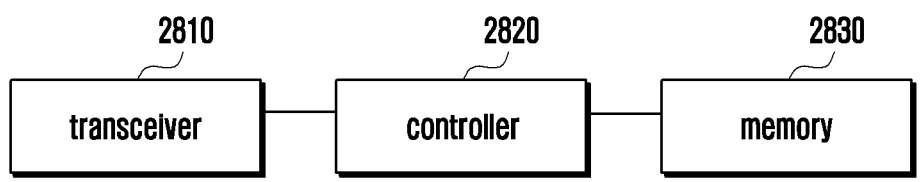
FIG. 28 is a block diagram of a base station according to an embodiment of the disclosure.

FIG. 28 is a block diagram of a base station according to an embodiment of the disclosure.

Referring to FIG. 28, a base station includes a transceiver 2810, a controller 2820 and a memory 2830. The controller 2820 may refer to a circuitry, an ASIC, an FPGA, or at least one processor. The transceiver 2810, the controller 2820 and the memory 2830 are configured to perform the operations of the gNB illustrated in the figures, e.g. FIGS. 1 to 26, or as otherwise described above. Although the transceiver 2810, the controller 2820 and the memory 2830 are shown as separate entities, they may be integrated onto a single chip. The transceiver 2810, the controller 2820 and the memory 2830 may also be electrically connected to or coupled with each other.

The transceiver 2810 may transmit and receive signals to and from other network entities, e.g., a terminal.

The controller 2820 may control the gNB to perform functions according to the embodiments described above. For example, the controller 2820 is configured to control the transceiver 2810 to broadcast system information including sidelink communication information of second RAT. The controller 2820 is configured to control the transceiver 2810 to receive a sidelink UE information message for sidelink communication according to second RAT to camped cell of first RAT. The controller 2820 is configured to control the transceiver 2810 to provide resources for sidelink communication according to second RAT in dedicated signaling.

In an embodiment, the operations of the base station may be implemented using the memory 2830 storing corresponding program codes. Specifically, the base station may be equipped with the memory 2830 to store program codes implementing desired operations. To perform the desired operations, the controller 2820 may read and execute the program codes stored in the memory 2830 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
    receiving, from a base station associated with a first radio access technology (RAT), a system information block containing configuration information for a sidelink communication according to a second RAT;
    in case that a frequency on which the UE is configured to transmit a sidelink signal according to the second RAT is included in an inter frequency information list within the configuration information, identifying whether the configuration information includes transmission resources for the sidelink signal according to the second RAT; and
    in case that the configuration information does not include the transmission resources for the sidelink signal according to the second RAT, performing a radio resource control (RRC) connection for the sidelink communication according to the second RAT.

2. The method of claim 1, further comprising:
    transmitting, to the base station, a sidelink UE information message for the sidelink communication according to the second RAT; and
    receiving, from the base station, an RRC reconfiguration message including the transmission resources for the sidelink signal according to the second RAT.

3. The method of claim 2, further comprising transmitting, to another UE, the sidelink signal according to the second RAT based on the transmission resources.

4. The method of claim 1, wherein the first RAT corresponds to a long term evolution (LTE) communication and the second RAT corresponds to a new radio (NR) communication system.

5. The method of claim 1, wherein the first RAT corresponds to a new radio (NR) communication system and the second RAT corresponds to a long term evolution (LTE) communication system.

6. A user equipment (UE) in a wireless communication system, the UE comprising:
    a transceiver; and
    at least one processor operatively coupled with the transceiver and configured to:
        control the transceiver to receive, from a base station associated with a first radio access technology (RAT), a system information block containing configuration information for a sidelink communication according to a second RAT,
        in case that a frequency on which the UE is configured to transmit a sidelink signal according to the second RAT is included in an inter frequency information list within the configuration information, identify whether the configuration information includes transmission resources for the sidelink signal according to the second RAT, and
        in case that the configuration information does not include the transmission resources for the sidelink signal according to the second RAT, perform a radio resource control (RRC) connection for the sidelink communication according to the second RAT.

7. The UE of claim 6, wherein the at least one processor is further configured to:
    control the transceiver to transmit, to the base station, a sidelink UE information message for the sidelink communication according to the second RAT, and
    control the transceiver to receive, from the base station, an RRC reconfiguration message including the transmission resources for the sidelink signal according to the second RAT.

8. The UE of claim 7, wherein the at least one processor is further configured to control the transceiver to transmit, to another UE, the sidelink signal according to the second RAT based on the transmission resources.

9. The UE of claim 6, wherein the first RAT corresponds to a long term evolution (LTE) communication and the second RAT corresponds to a new radio (NR) communication system.

10. The UE of claim 6, wherein the first RAT corresponds to a new radio (NR) communication system and the second RAT-corresponds to a long term evolution (LTE) communication system.

11. A method performed by a base station associated with a first radio access technology (RAT) in a wireless communication system, the method comprising:
    transmitting system information block containing configuration information for a sidelink communication according to a second RAT; and
    in case that a frequency on which a user equipment (UE) is configured to transmit a sidelink signal according to the second RAT is included in an inter frequency information list within the configuration information, and the configuration information does not include transmission resources for the sidelink signal according to the second RAT, performing, with the UE, a radio resource control (RRC) connection for the sidelink communication according to the second RAT.

12. The method of claim 11, further comprising:
    receiving, from the UE, a sidelink UE information message for the sidelink communication according to the second RAT; and
    transmitting, to the UE, an RRC reconfiguration message including the transmission resources for the sidelink signal according to the second RAT.

13. The method of claim 12, wherein the transmission resources are used to transmit the sidelink signal according to the second RAT to another UE.

14. The method of claim 11, wherein the first RAT corresponds to a long term evolution (LTE) communication system, and the second RAT corresponds to a new radio (NR) communication system.

15. The method of claim 11, wherein the first RAT corresponds to a new radio (NR), communication system, and the second RAT corresponds to a long term evolution (LTE) communication system.

16. A base station associated with a first radio access technology (RAT) in a wireless communication system, the base station comprising:
 a transceiver; and
 at least one processor operatively coupled with the transceiver and configured to:
  control the transceiver to transmit a system information block containing configuration information for a sidelink communication according to a second RAT, and
  in case that a frequency on which a user equipment (UE) is configured to transmit a sidelink signal according to the second RAT is included in an inter frequency information list within the configuration information, and the configuration information does not include transmission resources for the sidelink signal according to the second RAT, perform, with the UE, a radio resource control (RRC) connection for the sidelink communication according to the second RAT.

17. The base station of claim 16, wherein the at least one processor is further configured to:
 control the transceiver to receive, from the UE, a sidelink UE information message for the sidelink communication according to the second RAT, and
 control the transceiver to transmit, to the UE, an RRC reconfiguration message including the transmission resources for the sidelink signal according to the second RAT.

18. The base station of claim 17, wherein the transmission resources are used to transmit the sidelink signal according to the second RAT to another UE.

19. The base station of claim 16, wherein the first RAT corresponds to a long term evolution (LTE) communication system, and the second RAT corresponds to a new radio (NR) communication system.

20. The base station of claim 16, wherein the first RAT corresponds to a new radio (NR), communication system, and the second RAT corresponds to a long term evolution (LTE) communication system.

* * * * *